(12) United States Patent
Shiino et al.

(10) Patent No.: US 11,075,599 B2
(45) Date of Patent: Jul. 27, 2021

(54) BRUSHLESS MOTOR

(71) Applicant: HITACHI AUTOMOTIVE SYSTEMS, LTD., Hitachinaka (JP)

(72) Inventors: Kohtaro Shiino, Isehara (JP); Mitsuo Sasaki, Hadano (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 15 days.

(21) Appl. No.: 16/482,567

(22) PCT Filed: Jan. 22, 2018

(86) PCT No.: PCT/JP2018/001717
§ 371 (c)(1),
(2) Date: Jul. 31, 2019

(87) PCT Pub. No.: WO2018/147054
PCT Pub. Date: Aug. 16, 2018

(65) Prior Publication Data
US 2020/0044594 A1 Feb. 6, 2020

(30) Foreign Application Priority Data

Feb. 8, 2017 (JP) .............................. JP2017-020829

(51) Int. Cl.
*H02P 25/18* (2006.01)
*H02P 23/20* (2016.01)
(Continued)

(52) U.S. Cl.
CPC .......... *H02P 25/188* (2013.01); *B62D 5/0463* (2013.01); *H02K 7/116* (2013.01)

(58) Field of Classification Search
CPC ............... H02P 21/14; H02P 6/00; H02P 6/18
See application file for complete search history.

(56) References Cited

U.S. PATENT DOCUMENTS 5,614,799 A * 3/1997 Anderson ................. H02P 1/32
318/400.09
2005/0269895 A1* 12/2005 Innami ................. B62D 5/0403
310/429
(Continued)

FOREIGN PATENT DOCUMENTS

JP 2012-029416 A 2/2012
JP 2012-161154 A 8/2012
(Continued)

OTHER PUBLICATIONS

International Search Report dated Apr. 3, 2018 in International Application No. PCT/JP2018/001717.
(Continued)

*Primary Examiner* — Kawing Chan
*Assistant Examiner* — Charles S Laughlin
(74) *Attorney, Agent, or Firm* — Foley & Lardner LLP

(57) ABSTRACT

A brushless motor includes: a motor rotor; a stator coil section which has a plurality of energization phases, which includes a first stator coil and a second stator coil that are provided to each phase, and which is arranged to generate a magnetic field, and thereby rotate the motor rotor; and a connection switching section configured to switch a connection of the first stator coil and the second stator coil from a serial connection to a parallel connection, or from the parallel connection to the serial connection.

17 Claims, 16 Drawing Sheets

(51) Int. Cl.
*B62D 5/04* (2006.01)
*H02K 7/116* (2006.01)

(56) References Cited

U.S. PATENT DOCUMENTS

| | | | |
|---|---|---|---|
| 2008/0099626 A1* | 5/2008 | Bialke | B64G 1/244 |
| | | | 244/165 |
| 2012/0194109 A1 | 8/2012 | Uryu et al. | |
| 2013/0175954 A1* | 7/2013 | Astigarraga | H02P 3/12 |
| | | | 318/376 |
| 2013/0229136 A1* | 9/2013 | Bates | H02P 25/18 |
| | | | 318/400.41 |
| 2014/0132197 A1 | 5/2014 | Kanazawa et al. | |
| 2017/0166248 A1 | 6/2017 | Asao et al. | |

FOREIGN PATENT DOCUMENTS

| | | |
|---|---|---|
| JP | 2013-115901 A | 6/2013 |
| JP | 2014-096915 A | 5/2014 |
| WO | WO-2016/063368 A1 | 4/2016 |

OTHER PUBLICATIONS

Written Opinion of the International Searching Authority dated Apr. 3, 2018 in International Application No. PCT/JP2018/001717.

* cited by examiner

FIG. 4
(a)
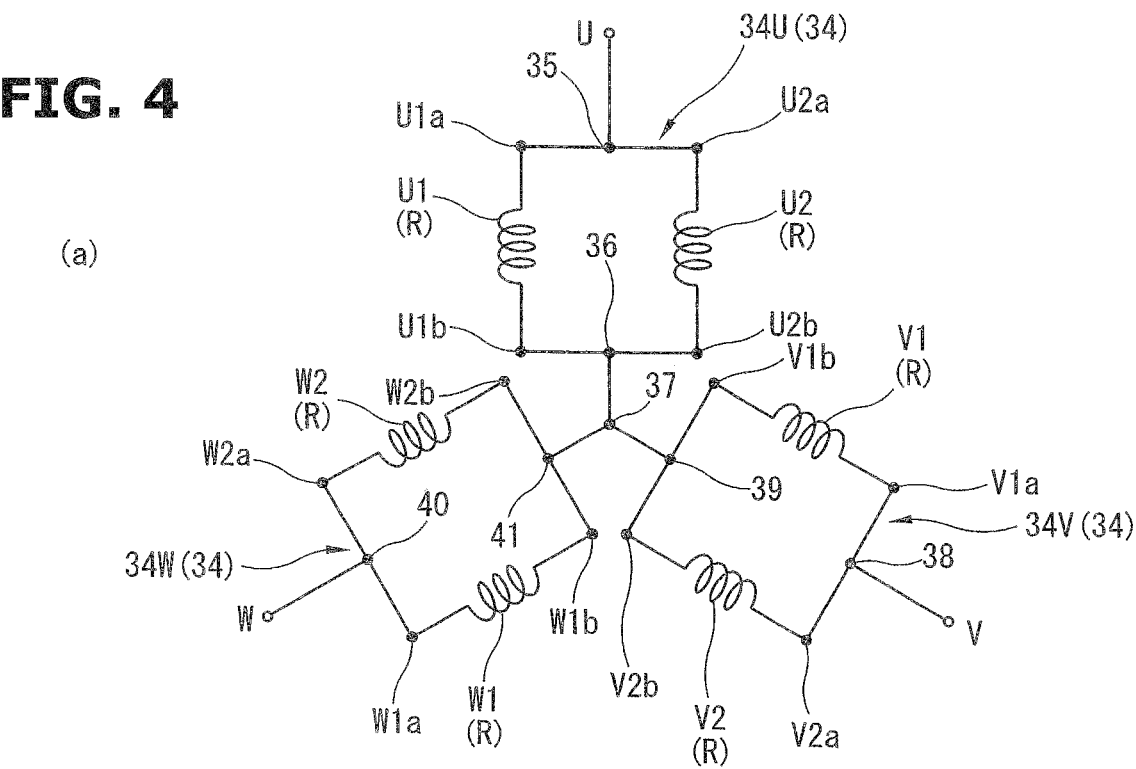
(b)
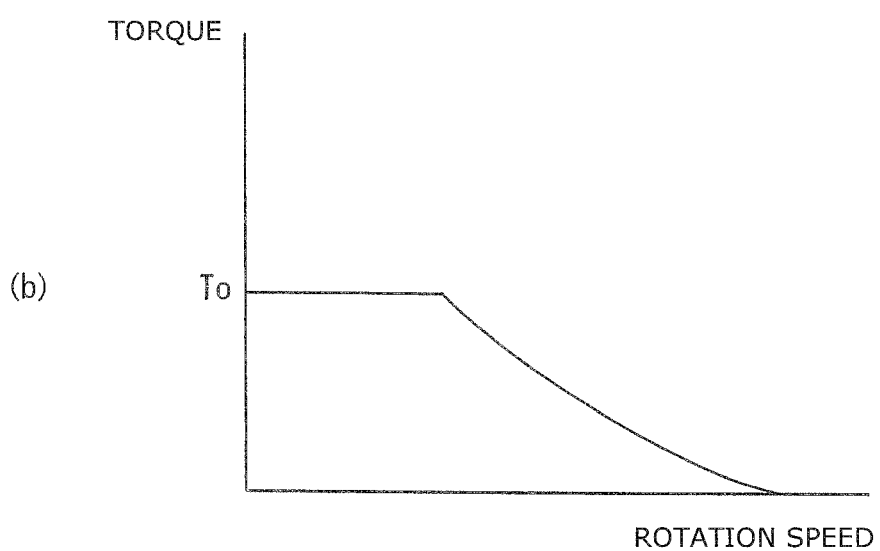

FIG. 5
(a)
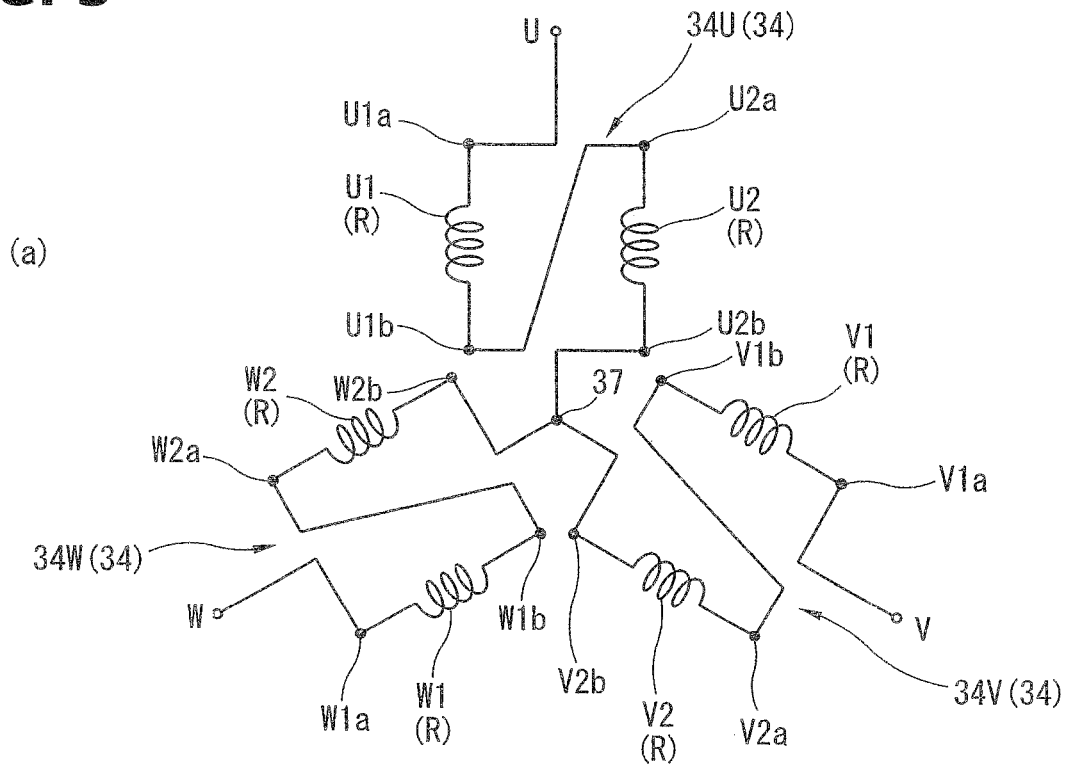
(b)
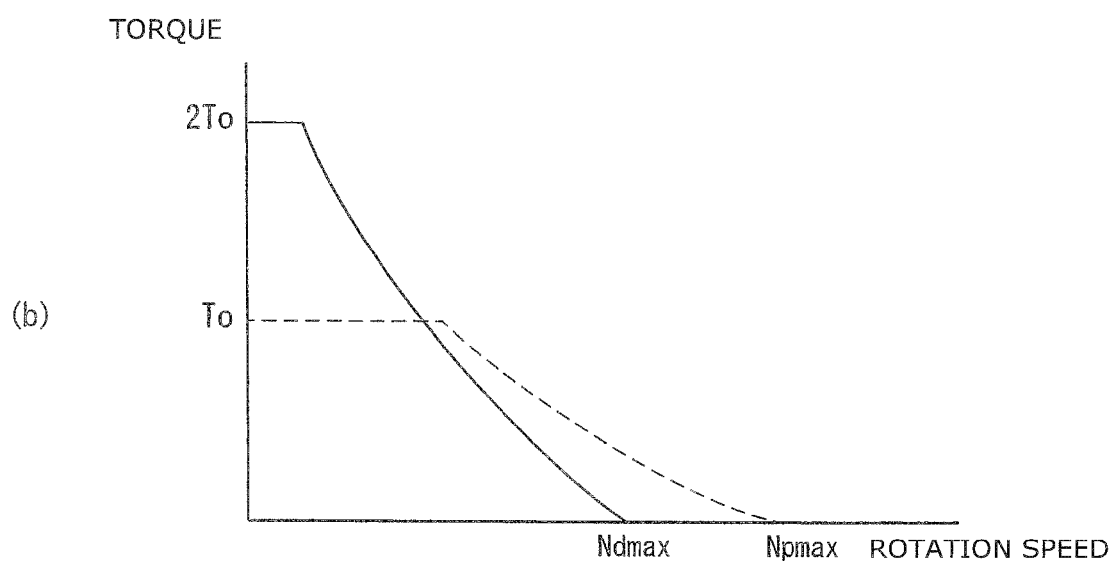

BRUSHLESS MOTOR

TECHNICAL FIELD

This invention relates to a brushless motor.

BACKGROUND ART

There has been known, as a brushless motor, a three-phase brushless motor described, for example, in a following patent document 1.

In the brushless motor described in the patent document 1, three phase alternating current power is supplied to stator coils of respective phases so as to generate magnetic field. With this, a motor rotor is rotated.

PRIOR ART DOCUMENT

Patent Document

Patent Document 1: WO 2016/063368 A1

SUMMARY OF THE INVENTION

Problems which the Invention is Intended to Solve

In the patent document 1, in the three phase brushless motor, the line resistances and the currents of the respective phases are constant. Accordingly, it is problematic that only one of high torque characteristics and high speed characteristics is used.

It is, therefore, an object of the present invention to provide a brushless motor devised to solve the above-described problems, and to be used by switching high torque characteristics and high speed characteristics in accordance with a usage condition.

Means for Solving the Problem

In one aspect according to the present invention, the brushless motor includes a connection switching section configured to switch the connection of the first stator coils and the second stator coils from the serial connection to the parallel connection.

Benefit of the Invention

By the present invention, it is possible to switch the high torque characteristics and the high rotation speed characteristics in accordance with the usage condition.

BRIEF DESCRIPTION OF DRAWINGS

FIG. 4(a) is a connection diagram of a stator coil in a parallel connection. FIG. 4(b) is a graph showing a torque and a rotation speed of the motor in the parallel connection.

FIG. 5(a) is a connection diagram of a stator coil in a serial connection. FIG. 5(b) is a graph showing a torque and a rotation speed of the motor in the serial connection.

DESCRIPTION OF EMBODIMENTS

Hereinafter, brushless motors according to embodiments of the present invention are explained with reference to the drawings.

First Embodiment (Configuration of Power Steering Device)

Figure 1:
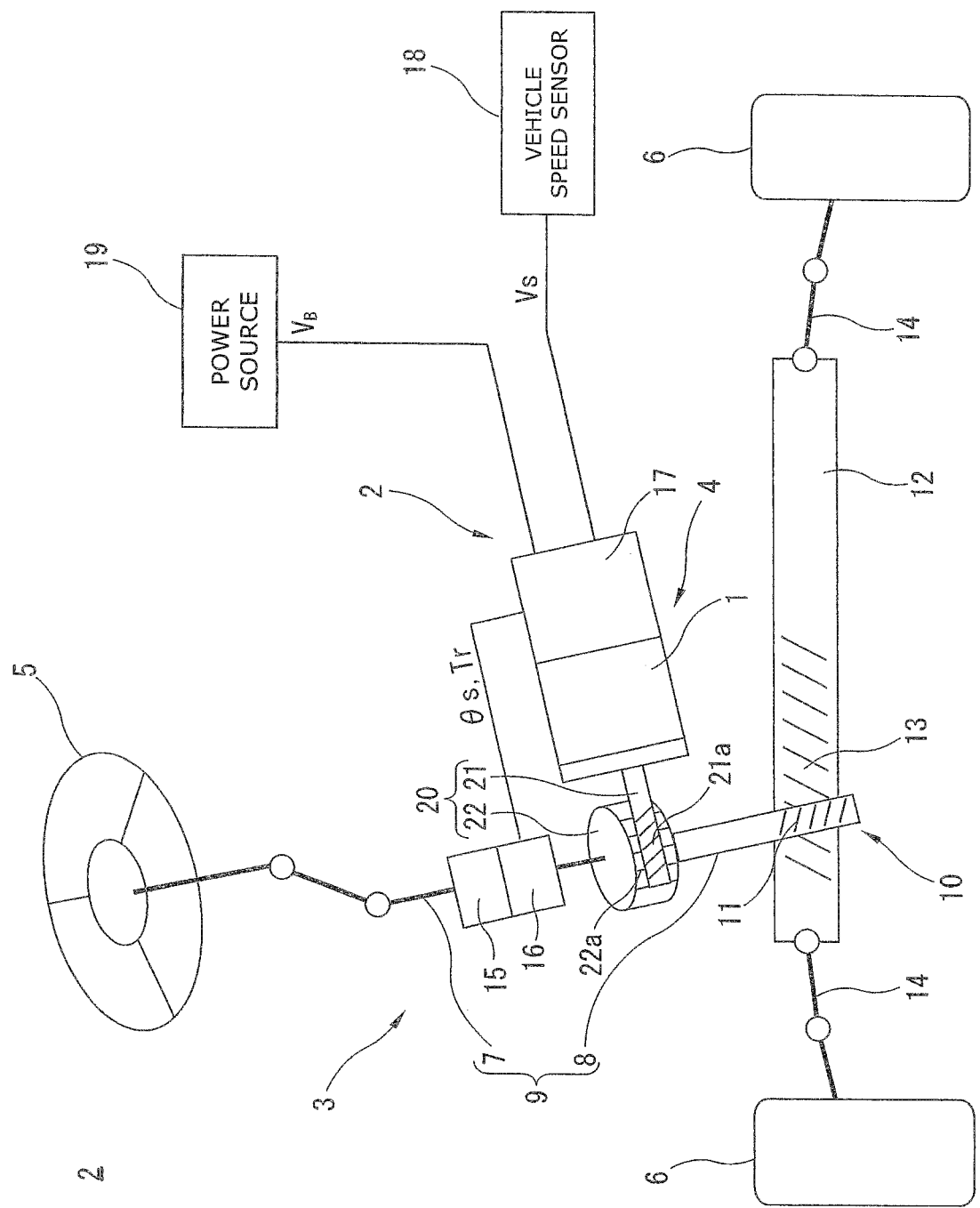
FIG. 1 is a schematic view showing an electric power steering device when viewed from a front side of a vehicle.

FIG. 1 is a schematic view showing an electric power steering device 2 to which a motor 1 in a first embodiment is applied.

As shown in FIG. 1, the electric power steering device 2 includes a steering mechanism 3 arranged to transmit a steering force from a driver; and a steering assist mechanism 4 arranged to assist the steering operation of the driver.

The steering mechanism 3 mechanically connects a steering wheel 5 disposed within a driving cabin of a vehicle, and two steered wheels 6 and 6 which are front wheels of the vehicle. The steering mechanism 3 includes a steering shaft 9 including an input shaft 7 to which a rotation force from the steering wheel 5 is transmitted, and an output shaft 8 connected through a torsion bar (not shown) to the input shaft 7; and a turning mechanism 10 arranged to transmit the rotation of the steering shaft 9 to the steered wheels 6 and 6 to turn the steered wheels 6. The turning mechanism 10 includes a rack and pinon mechanism (rack and pinion gear) including a pinion 11 provided on an outer circumference of the output shaft 8, and a rack 13 provided on an outer circumference of a rack bar 12. Both ends of the rack bar 12 are connected, respectively, through tie rods 14 and 14 and two knuckle arms (not shown) to the steered wheels 6 and 6.

An annular steering angle sensor 15 and an annular torque sensor 16 are provided around the steering shaft 9. The steering angle sensor 15 is arranged to sense a steering angle θs which is a rotation amount from a neutral positon of the steering wheel 5. The torque sensor 16 is arranged to sense a steering torque Tr which is varied in accordance with a twist amount of the torsion bar. The steering angle θs and the steering torque Tr which are sensed by the steering angle sensor 15 and the torque sensor 16 are outputted through harnesses (not shown) to a control device (ECU) 17 of the motor 1. Moreover, the control device 17 receives a vehicle speed Vs sensed by a vehicle speed sensor 18. The control device 17 is electrically connected to a power source (power supply) 19 arranged to supply electric power to the control device 17.

The steering assist mechanism 4 includes the motor 1 which is an electric motor arranged to provide steering assist force to the steering mechanism 3; the control device 17 configured to control and drive the motor 1; and a worm gear 20 which is a speed reducer (transmitting mechanism).

The motor 1 is a three phase brushless motor arranged to be driven by a three-phase alternating current power. The motor 1 is integrally constituted with the control device 17.

The control device 17 is constituted by electric components such as microcomputer. The control device 17 is configured to control and drive the motor 1 based on the steering angle θs, the steering torque Tr, vehicle speed Vs, and so on.

The worm gear 20 is arranged to reduce the speed of the steering assist force (the rotation force) outputted from the motor 1, and to transmit the speed-reduced steering assist force to the output shaft 8. The worm gear 20 includes a worm shaft 21 which includes a teeth portion 21*a* formed on an outer circumference of the worm shaft 21, and which is provided to a drive shaft 104 (cf. FIG. 2) of the motor 1; and a worm wheel 22 which includes a teeth portion 22*a* formed on an outer circumference of the worm wheel 22, and engaged with the teeth portion 21*a*, and which is arranged to rotate as a unit with the output shaft 8.

In the above-described electric power steering device 2, when the drive rotates the steering wheel 5, the input shaft 7 is rotated to twist the torsion bar. By the elastic force of the twisted torsion bar, the output shaft 8 is rotated. The rotation of the output shaft 8 is converted to a linear motion of the rack bar 12 in the axial direction, by the rack and pinion mechanism. With these, the two knuckle arms is pushed and pulled through the tie rods 14 and 14 in the vehicle widthwise direction, so that the directions of the steered wheels 6 and 6 are varied.

Hereinafter, following directions are defined for explanations. A "motor axial direction" is defined by a direction along the motor shaft 21. A "motor radial direction" is defined by a direction perpendicular to the worm shaft 21. Moreover, a "motor circumferential direction" is defined by a direction along a circumference of the worm shaft 21.
(Configuration of Brushless Motor of One System)

Figure 2:
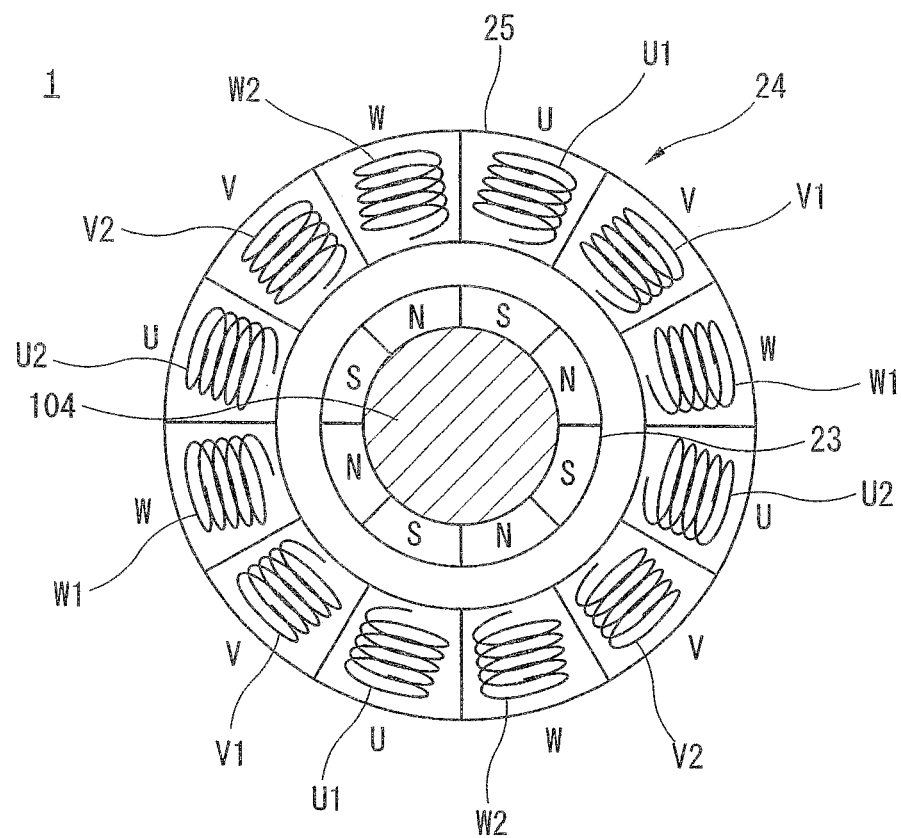
FIG. 2 is a schematic sectional view showing a motor of a first system (circuit) in a first embodiment.

FIG. 2 is a schematic sectional view which shows the motor 1 of the one system in the first embodiment, and which is taken along the motor radial direction.

The motor 1 is the three-phase brushless motor having the one system. The motor 1 includes a motor rotor 23 and a motor stator 24.

The motor rotor 23 has an annular shape. The motor rotor 23 is fixed on an outer circumference of the worm shaft 21. The motor rotor 23 includes permanent magnets in which a plurality of N poles and S poles are alternately disposed along the outer circumference of the worm shaft 21. In this embodiment, eight poles of four N poles and four S poles are disposed along the outer circumference of the worm shaft 21. Besides, the number of the N pole and the S pole are not limited to the plural. One N pole and one S pole may be disposed along the outer circumference of the worm shaft 21.

Similarly, the motor stator 24 has the annular shape. The motor stator 24 is disposed radially outside the motor rotor 23 with a predetermined clearance between the motor stator 24 and the motor rotor 23. The motor stator 24 is fixed on an inner circumference of a motor housing (not shown) receiving the motor 1, for example, by shrinkage fitting. The motor stator 24 includes, for example, a plurality of T-shaped core pieces (not shown). The motor stator 24 is constituted by the T-shaped core pieces continuously disposed in an annular shape. In this embodiment, the motor stator 24 includes twelve T-shaped core pieces. Each of the T-shaped core pieces has a teeth portion around which a stator coil is wound.

Moreover, the motor stator 24 includes a stator coil section 25 including three energization phases of U phase, V phase, and W phase. The U phase, the V phase, and the W phase which are shown by "U", "V", and "W" in FIG. 2 are disposed in an order of the U phase, the V phase, the W phase, the U phase, the V phase, the W phase, the U phase, the V phase, the W phase, the U phase, the V phase, and the W phase in a clockwise direction in FIG. 2 at an interval of 30 degrees.

In the four U phases disposed at the regular interval in the motor circumferential direction, a first stator coil U1 and a second stator coil U2 are wound around the teeth portions to be alternately disposed in the motor circumferential direction, as shown in FIG. 2. In a state where the stator coils U1 and U2 are wounded, both end portions U1*a* and U1*b* of the first stator coil U1 and both end portions U2*a* and U2*b* of the second stator coil U2 are disposed on a first end side of the motor axial direction (cf. FIG. 3). That is, the both end portions U1*a* and U1*b* of the first stator coil U1 and the both end portions U2*a* and U2*b* of the second stator coil U2 are disposed on the same side of the motor rotor 23 in the rotation axis direction of the motor rotor 23.

Similarly, in four V phases disposed at the regular interval in the motor circumferential direction, a first stator coil V1 and a second stator coil V2 are wound around the teeth portions to be alternately disposed in the motor circumferential direction, as shown in FIG. 2. In a state where the stator coils V1 and V2 are wounded, both end portions V1*a* and V1*b* of the first stator coil V1 and both end portions V2*a* and V2*b* of the second stator coil V2 are disposed on the first end side of the motor axial direction (cf. FIG. 3). That is, the both end portions V1*a* and V1*b* of the first stator coil V1 and the both end portions V2*a* and V2*b* of the second stator coil V2 are disposed on the same side of the motor rotor 23 in the rotation axis direction of the motor rotor 23.

Similarly, in four W phases disposed at the regular interval in the motor circumferential direction, a first stator coil W1 and a second stator coil W2 are wound around the teeth portions to be alternately disposed in the motor circumferential direction, as shown in FIG. 2. In a state where the stator coils W1 and W2 are wounded, both end portions W1a and W1b of the first stator coil W1 and both end portions W2a and W2b of the second stator coil W2 are disposed on the first end side of the motor axial direction (cf. FIG. 3). That is, the both end portions W1a and W1b of the first stator coil W1 and the both end portions W2a and W2b of the second stator coil W2 are disposed on the same side of the motor rotor 23 in the rotation axis direction of the motor rotor 23.

The first stator coils U1, V1, and W1 and the second stator coils U2, V2, and W2 are constituted to have identical functions. The first stator coils U1, V1, and W1 and the second stator coils U2, V2, and W2 are electrically connected in a serial manner or a parallel manner by a star connection (Y connection) described later.

Figure 3:
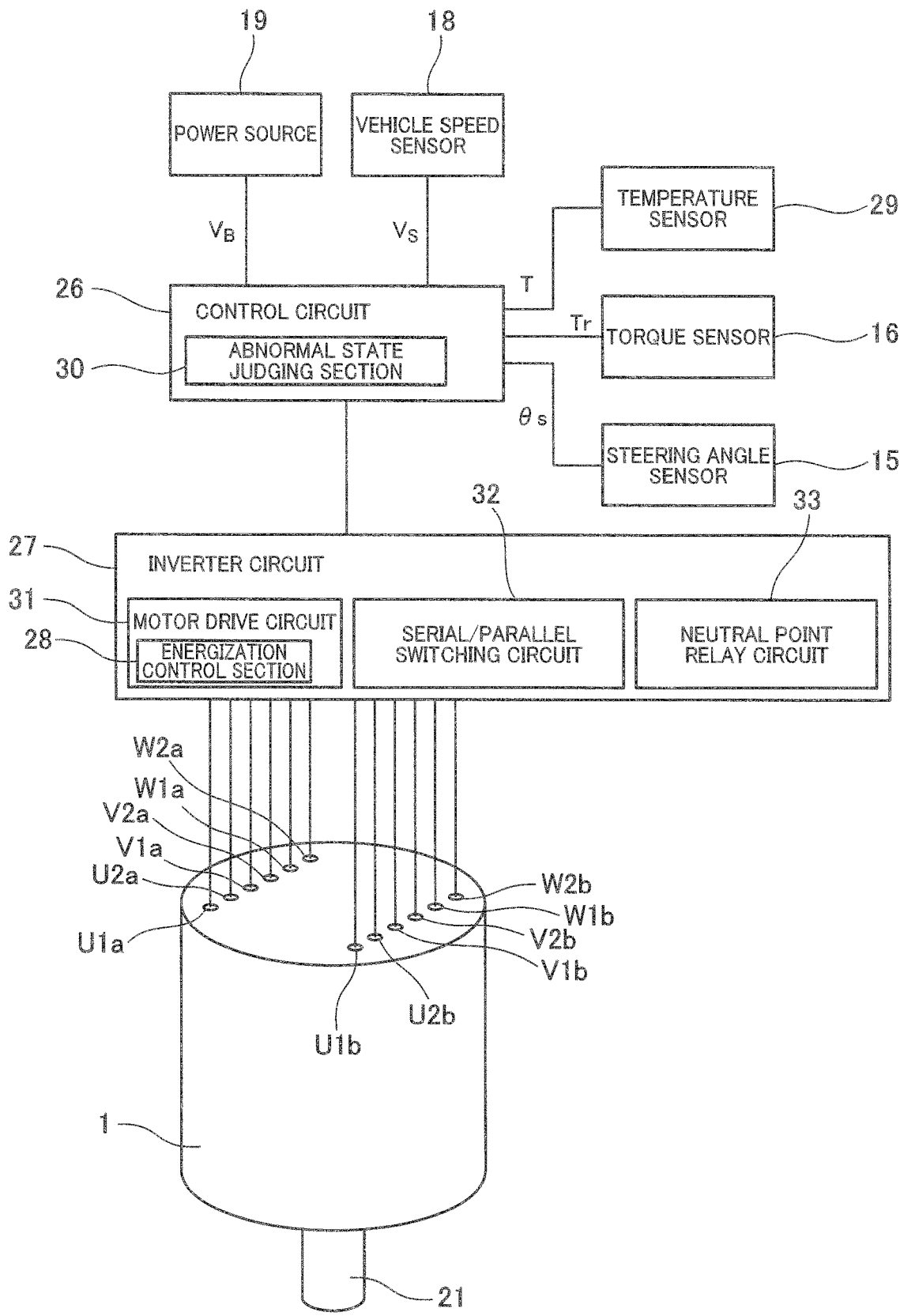
FIG. 3 is a control block diagram of a motor in the first embodiment.

FIG. 3 is a control block diagram showing the motor 1.

The control device includes a control circuit 26 configured to produce a motor command signal based on driving information obtained from various sensors; and an inverter circuit 27 configured to drive the motor 1 based on this motor command signal.

The control circuit 26 is constituted by a circuit board, a microcomputer and so on. The control circuit 26 is electrically connected to the power source 19, the vehicle speed sensor 18, the torque sensor 16, and the steering angle sensor 15. Moreover, the control circuit 26 is electrically connected to a temperature sensor 29 arranged to sense a temperature (heating value) of a switching element (not shown) of an energization control section 28 described later. The control circuit 26 includes a power module configured to produce the three phase alternating current power supplied to the motor 1, based on electric power $V_B$ supplied from the power source 19. The control circuit 26 is configured to produce the motor command signal based on the driving information (signal) from the various sensors, for example, the vehicle speed Vs from the vehicle speed sensor 18, the steering torque Tr from the torque sensor 16, the steering angle θs from the steering angle sensor 15, and the temperature T from the temperature sensor 29, and to output the motor command signal to the inverter circuit 27.

Moreover, the control circuit 26 includes an abnormal state judging section 30 configured to judge whether or not it is possible to normally perform an energization control in the stator coil section 25. The abnormal state judging section 30 is configured to judge the abnormal state of the motor 1 by judging, for example, the disconnection of the stator coils U1, U2, V1, V2, W1, and W2, malfunction of the switching element described later, malfunction of the microcomputer configured to control the switching element, and malfunction of the control circuit 26.

The inverter circuit 27 includes a motor drive circuit 31 configured to control the motor 1 based on the motor command signal; a serial/parallel switching circuit 32 configured to switch connections among the stator coils U1, U2, V1, V2, W1, and W2; and a neutral point relay circuit 33 configured to be used for a failsafe operation of the motor 1.

The motor drive circuit 31 includes an energization control section 28 configured to perform the energization control of the stator coil section 25 by switching ON/OFF states of the plurality of the switching elements (not shown), for example, MOS transistors (MOS-FET) which are field effect transistors.

The serial/parallel switching circuit 32 is configured to switch the connections among the first stator coils U1, V1, and W1 and the second stator coils U2, V2, and W2 to the serial connection or the parallel connection, by connection switching portions 34U, 34V, and 34W described later.

FIG. 4(a) is a connection diagram of the stator coils U1, U2, V1, V2, W1, and W2 in the parallel connection.

As shown in FIG. 4(a), the first stator coil U1 and the second stator coil U2 which are wound in the U phase are connected in parallel with each other. That is, the first end portion U1a of the first stator coil U1 is electrically connected to the first end portion U2a of the second stator coil U2. On the other hand, the second end portion U1b of the first stator coil U1 is electrically connected to the second end portion of the second stator coil U2. A common connection point 35 between the first end portion U1a of the first stator coil U1 and the first end portion U2a of the second stator coil U2 is electrically connected to the inverter circuit 27. A common connection point 36 between the second end portion U1b of the first stator coil U1 and the second end portion U2b of the second stator coil U2 is electrically connected to the neutral connection point 37.

Similarly, as shown in FIG. 4(a), the first stator coil V1 and the second stator coil V2 which are wound in the V phase are connected in parallel with each other. That is, the first end portion V1a of the first stator coil V1 is electrically connected to the first end portion V2a of the second stator coil V2. On the other hand, the second end portion V1b of the first stator coil V1 is electrically connected to the second end portion of the second stator coil V2. A common connection point 38 between the first end portion V1a of the first stator coil V1 and the first end portion V2a of the second stator coil V2 is electrically connected to the inverter circuit 27. A common connection point 39 between the second end portion V1b of the first stator coil V1 and the second end portion V2b of the second stator coil V2 is electrically connected to the neutral connection point 37.

Similarly, as shown in FIG. 4(a), the first stator coil W1 and the second stator coil W2 which are wound in the W phase are connected in parallel with each other. That is, the first end portion W1a of the first stator coil W1 is electrically connected to the first end portion W2a of the second stator coil W2. On the other hand, the second end portion W1b of the first stator coil W1 is electrically connected to the second end portion of the second stator coil W2. A common connection point 40 between the first end portion W1a of the first stator coil W1 and the first end portion W2a of the second stator coil W2 is electrically connected to the inverter circuit 27. A common connection point 41 between the second end portion W1b of the first stator coil W1 and the second end portion W2b of the second stator coil W2 is electrically connected to the neutral connection point 37.

Accordingly, as shown in FIG. 4(a), the first and second stator coils U1 and U2 connected in parallel, the first and second stator coils V1 and V2 connected in parallel, and the firsts and second stator coils W1 and W2 connected in parallel are electrically connected through the neutral point 37 by the star connection (Y connection).

Each of the first stator coils U1, V1, and W1 and the second stator coils U2, V2, and W2 has a resistance R. Accordingly, a line resistance between the U phase and the V phase, a line resistance between the V phase and the W phase, and a line resistance between the W phase and the U phase are R from the know calculation of the parallel connection of the resistance.

FIG. 4(b) is a graph showing a relationship between the torque and the rotation speed of the motor 1 in the parallel connection.

As shown in FIG. 4(b), the torque of the motor 1 is constant torque $T_0$ when the rotation speed of the motor 1 is from 0 to a predetermined rotation speed. After the predetermined rotation speed, the torque of the motor 1 is decreased in a gentler curved manner by weak field control.

FIG. 5(a) is a connection diagram of the stator coils U1, U2, V1, V2, W1, and W2 in the serial connection.

As shown in FIG. 5(a), the first stator coil U1 and the second stator coil U2 which are wound in the U phase are connected in series with each other. That is, the second end portion U1b of the first stator coil U1 is electrically connected to the first end portion U1a of the second stator coil U2. The first end portion U1a of the first stator coil U1 is electrically connected to the inverter circuit 27. The second end portion U2b of the second stator coil U2 is electrically connected to the neutral point 37.

Similarly, as shown in FIG. 5(a), the first stator coil V1 and the second stator coil V2 which are wound in the V phase are connected in series with each other. That is, the second end portion V1b of the first stator coil V1 is electrically connected to the first end portion V2a of the second stator coil V2. The first end portion V1a of the first stator coil V1 is electrically connected to the inverter circuit 27. The second end portion V2b of the second stator coil V2 is electrically connected to the neutral point 37.

Similarly, as shown in FIG. 5(a), the first stator coil W1 and the second stator coil W2 which are wound in the W phase are connected in series with each other. That is, the second end portion W1b of the first stator coil W1 is electrically connected to the first end portion W2a of the second stator coil W2. The first end portion W1a of the first stator coil W1 is electrically connected to the inverter circuit 27. The second end portion W2b of the second stator coil W2 is electrically connected to the neutral point 37.

Accordingly, as shown in FIG. 5(a), the first and second stator coils U1 and U2 connected in series with each other, the first and second stator coils V1 and V2 connected in series with each other, and the firsts and second stator coils W1 and W2 connected series with each other are electrically connected through the neutral point 37 by the star connection (Y connection).

FIG. 5(b) is a graph showing a relationship between the torque and the rotation speed of the motor 1 in the serial connection. In FIG. 5(b), a solid line shows a relationship between the torque and the rotation speed of the motor 1 in the serial connection. A broken line shows a relationship between the torque and the rotation speed of the motor 1 in the parallel connection.

In FIG. 5(b), a line resistance $R_0$ between the U phase and the V phase, a line resistance between the V phase and the W phase, and a line resistance between the W phase and the U phase are 4R from the known calculation of the serial connection of the resistance. That is, the line resistance in the serial connection is quadruple of the line resistance in the parallel connection.

Moreover, as is well known, the currents flowing between the U phase and the V phase, between the V phase and the W phase, and between the W phase and the U phase in the serial connection is double of the currents flowing between the U phase and the V phase, between the V phase and the W phase, and between the W phase and the U phase in the parallel connection.

In the motor 1, the torque is calculated by product of the current and the winding number. Accordingly, in the serial connection in which the current double of the current in the parallel connection flows, the torque obtained by the motor 1 is $2T_0$ which is double of the torque $T_0$ in the parallel connection, as shown in FIG. 5(b).

Moreover, in the motor 1, the rotation speed is varied in accordance with the resistance value of the winding. That is, the rotation speed is decreased as the resistance value of the winding is increased. In the serial connection in which the line resistance is quadruple of the line resistance in the parallel connection, a maximum rotation speed Ndmax crossing a transverse axis of FIG. 5(b) is smaller than a maximum rotation speed Npmax in the serial connection.

In this configuration of the motor 1, the three phase alternating current power controlled by the control circuit 26 is supplied to the stator coils U1, U2, V1, V2, W1, and W2 of the U phase, the V phase, and the W phase, so that the magnetic field is generated. With this, the motor rotor 23 is rotated.

Figure 6:
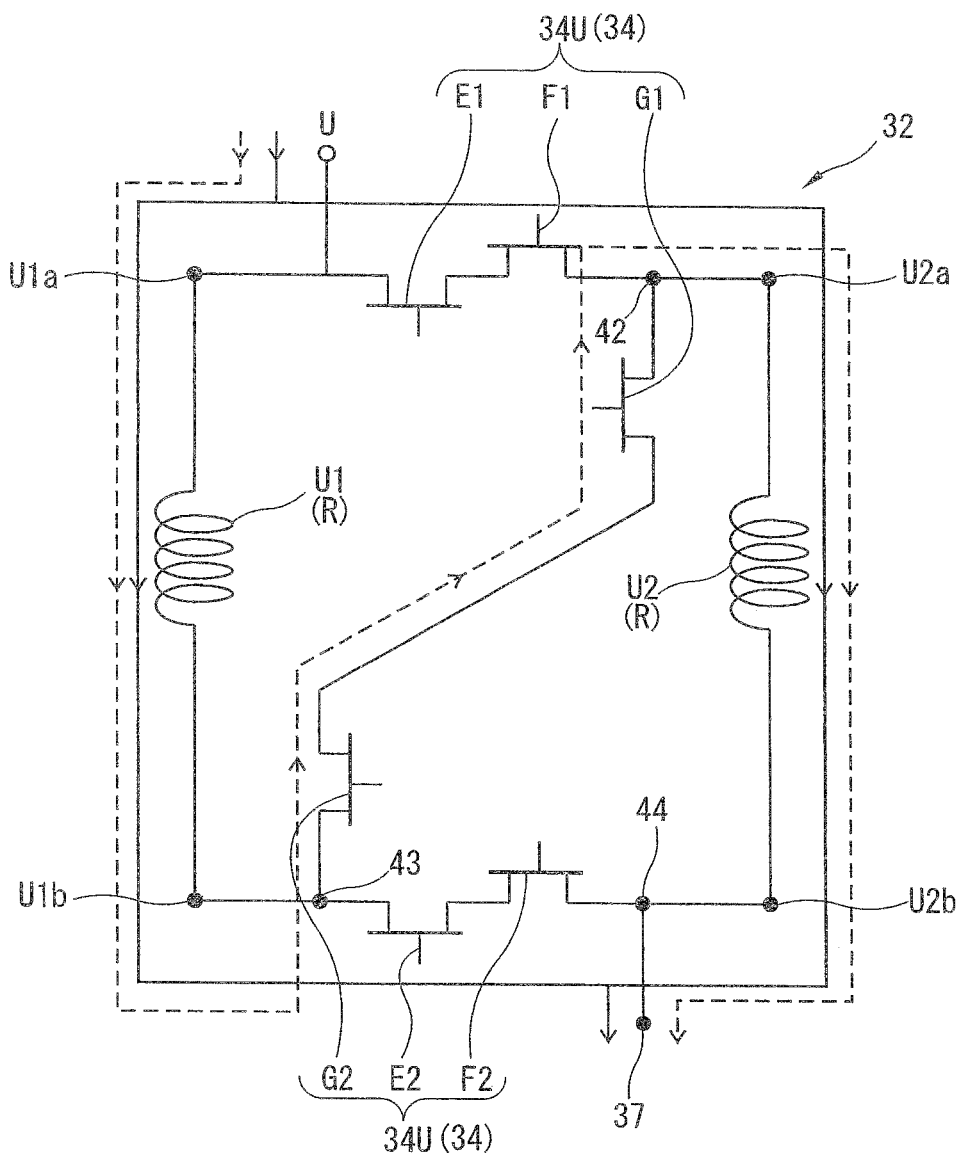
FIG. 6 is a schematic electric circuit diagram showing a serial/parallel switching circuit of an inverter circuit.

FIG. 6 is a schematic electric circuit diagram showing the serial/parallel switching circuit 32 of the inverter circuit 27. The serial/parallel switching circuit 32 is configured to switch the connections among the stator coils U1, U2, V1, V2, W1, and W2 between the serial connection shown in FIG. 4(a) and the parallel connection shown in FIG. 5(a). The serial/parallel switching circuit 34 includes a U phase connection switching section 34U, a V phase connection switching section 34V, and a W phase connection switching section 34W. The U phase connection switching section 34U is configured to switch the connections of the stator coils U1 and U2 from the serial connection to the parallel connection, or from the parallel connection to the serial connection. The V phase connection switching section 34V is configured to switch the connections of the stator coils V1 and V2 from the serial connection to the parallel connection, or from the parallel connection to the serial connection. The W phase connection switching section 34W is configured to switch the connections of the stator coils W1 and W2 from the serial connection to the parallel connection, or from the parallel connection to the serial connection.

The connection by the U phase connection switching section 34U, the connection by the V phase connection switching section 34V, and the connection by the W phase connection switching section 34W are switched in the same manner. Accordingly, in FIG. 6, the switching of the connection of the stator coils U1 and U2 by the U phase connection switching section 34 is explained as a representative.

The U phase connection switching section 34U includes a serial connection switching section G1 and G2 configured to be brought to the energization state, and thereby to connect the first stator coil U1 and the second stator coil U2 in serial with each other; and a parallel connection switching section E1, E2, F1, and F2 configured to be brought to the energization state, and thereby to connect the first stator coil U1 and the second stator coil U2 in parallel with each other. The switching sections E1, E2, F1, F2, G1, and G2 are switching elements which have an identical function, and which are field effect transistors, for example, MOS transistors (MOS-FETs).

The switching sections E1, E2, F1, F2, G1, and G2 are installed in the package module identical to that of the switching elements (not shown) of the above-described energization control section 28. That is, the switching sections E1, E2, F1, F2, G1, and G2 and the switching elements (not shown) of the energization control section 28 are mounted on the single circuit board.

In the serial/parallel switching circuit 32, the first end portion U1a of the first stator coil U1 is electrically connected to a drain of the parallel connection switching section E1 which is the MOS transistor. A source of the parallel connection switching section E1 is electrically connected to a source of the parallel connection switching section F1 which is the MOS transistor. A drain of the parallel connection switching section F1 is electrically connected to the first end portion U2a of the second stator coil U2. The second end portion U2b of the second stator coil U2 is electrically connected to a drain of the parallel connection switching section F2 which is the MOS transistor. A source of the parallel connection switching section F2 is electrically connected to a source of the parallel connection switching section E2 of the MOS transistor. A drain of the parallel connection switching section E2 is electrically connected to the second end portion U1b of the first stator coil U1. A common connection point 42 between the first end portion U2a of the second stator coil U2 and the drain of the parallel connection switching section F1 is electrically connected to a drain of the serial connection switching section G1 which is the MOS transistor. A source of the serial connection switching section G1 is electrically connected to a source of the serial connection switching section G2 which is the MOS transistor. A drain of the serial connection switching section G2 is electrically connected to a common connection point 43 between the second end portion U1b of the first stator coil U1 and the drain of the parallel connection switching section E2. A common connection point 44 between the second end portion U2b of the second stator coil U2 and the drain of the parallel connection switching section F2 is electrically connected to the neutral point 37.

The parallel connection switching sections E1 and F1, the parallel connection switching sections E2 and F2, and the serial connection switching sections G1 and G2 are used, respectively, as pairs. For example, the two parallel connection switching sections E1 and F1 are explained. The sources of the parallel connection switching sections E1 and F1 are electrically connected with each other. By controlling the parallel connection switching sections E1 and F1 to the OFF state, the current flowing from the parallel connection switching section E1 to the parallel connection switching section F1, and the current flowing from the parallel connection switching section F1 to the parallel connection switching section E1 can be shut off. Similarly, in the parallel connection switching sections E2 and F2, and the parallel connection switching sections G1 and G2, it is possible to shut off the bidirectional flow of the current.

Figure 7:
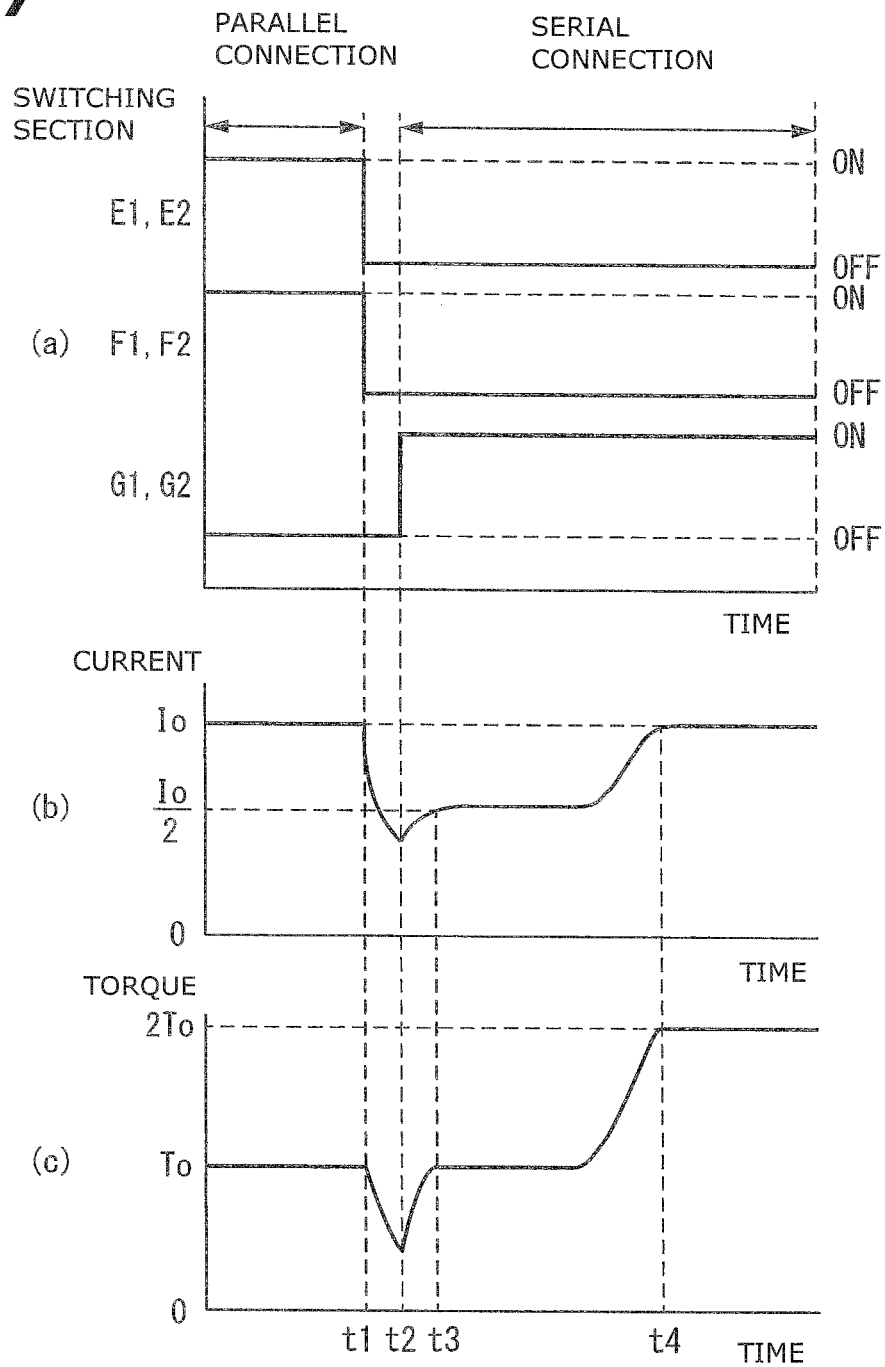
FIG. 7(a) is an explanation view showing a control of the switching section in the first embodiment when the connection of the stator coil is switched from the parallel connection to the serial connection.
FIG. 7(b) is a graph showing a variation of the current at the switching from the parallel connection to the serial connection.
FIG. 7(c) is a graph showing a variation of a torque at the switching from the parallel connection to the serial connection.

FIG. 7(a) is an explanation view showing a control of the switching sections E1, E2, F1, F2, G1, and G2 when the stator coils U1, U2, V1, V2, W1, and W2 are switched from the parallel connection to the serial connection. Besides, in FIG. 7(a), the switching of the stator coils U1 and U2 by the U phase connection switching section 34U is explained as a representative.

As shown in FIG. 7(a), when the stator coils U1 and U2 are connected in parallel with each other, the parallel connection switching sections E1, E2, F1, and F2 are in the ON state. On the other hand, the serial connection switching sections G1 and G2 are in the OFF state. That is, in the parallel connection, the parallel connection switching sections E1, E2, F1, and F2 are in the energization state. On the other hand, the serial connection switching sections G1 and G2 are in the deenergization state. In this case, the current flows through the first stator coil U1 and the parallel connection switching sections E2 and F2 to the neutral point 37. Moreover, the current flows through the parallel connection switching sections E1 and F1 and the second stator coil U2 to the neutral point 37 (cf. a solid arrow in FIG. 6).

Then, based on the driving information from the various sensors, the parallel connection switching sections E1, E2, F1, and F2 are switched from the ON state to the OFF state at time t1. Moreover, the serial connection switching sections G1 and G2 are switched from the OFF state to the ON state at time t2. With this, the stator coils U1 and U2 are connected in serial with each other. That is, the serial connection switching sections G1 and G2 are brought to the energization state. The parallel connection switching sections E1, E2, F1, and F2 are brought to the deenergization state. In this case, the current flows through the first stator coil U1, the serial connection switching sections G1 and G2, and the second stator coil U2 to the neutral point 37 (cf. a broken arrow in FIG. 6).

The driving information from the various sensors are, for example, the vehicle speed Vs from the vehicle speed sensor 18, the steering torque Tr from the torque sensor 16, the steering angle θs from the steering angle sensor 15, and the temperature T from the temperature sensor 29. Moreover, a steering speed calculated from the steering angle θs, and an output from a rotation angle sensor (not shown) and so on of the motor 1 may be used as the driving information, in place of the steering angle θs from the steering angle sensor 15.

Besides, in FIG. 7(a), a time interval between the time t1 and the time t2 is, for example, 1 μs.

FIG. 7(b) is a graph showing a variation of the current flowing in the serial/parallel switching circuit 32 when the connections of the stator coils U1 and U2 is switched from the parallel connection to the serial connection.

As shown in FIG. 7(b), in the parallel connection, the energization control section 28 controls the current (energization amount) flowing in the first stator coil U1 and the second stator coil U2, to a target value $I_0$ before the switching of the connection, that is, to the constant value until time t1. Then, the energization control section 28 controls the current from time t1 to time t2 to be gradually varied to be slightly smaller than a target value $I_0/2$ after the switching of the connection. Next, in the serial connection, the energization control section 28 controls the current to $I_0/2$ at time t3. The energization control section 28 controls the current to $I_0$.

FIG. 7(c) is a graph showing a variation of the torque of the motor 1 at the switching from the parallel connection to the serial connection.

As shown in FIG. 7(c), in the parallel connection, the torque is $T_0$ until time t1. As described above, the torque is calculated by product of the current and the winding number of the stator coil. Accordingly, the torque is decreased to be smaller than $T_0$ from time t1 to time t2 in accordance with the current decreased to be smaller than $I_0/2$. Then, at time t3, the torque is held to $T_0$ in accordance with the current held to $I_0/2$. At time t4, the torque is $2T_0$ in accordance with the current held to $I_0$.

In this way, the torque is $T_0$ at time t1. By decreasing the current to $I_0/2$ at time t3, the torque is smoothly set to $T_0$. Then, by increasing the current to $I_0$ at time t4, the torque is increased to $2T_0$.

A following example is conceivable as the above-described control. In a case where the connection of the first stator coil U1 and the second stator coil U2 is selected in accordance with the vehicle speed Vs, the parallel connection is selected from a middle vehicle speed to a high vehicle speed, and the serial connection is selected at a low vehicle speed at the parking (garaging). With this, the high torque is not outputted from the middle vehicle speed to the high vehicle speed. Accordingly, it is possible to ensure the safety of the driver. The high torque is outputted at the low vehicle speed. Consequently, it is possible to decrease a load of the driver.

Figure 8:
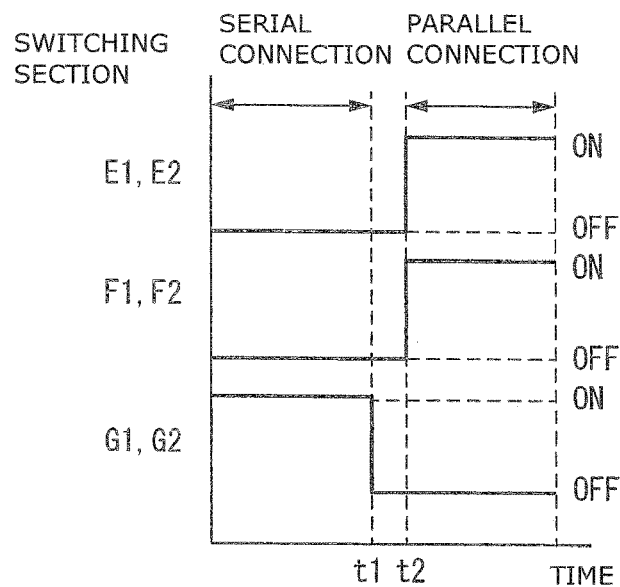
FIG. 8 is an explanation view showing a control in the control section when the connection of the stator coil is switched from the serial connection to the parallel connection.

FIG. 8 is an explanation view showing the control of the switching sections U1, U2, V1, V2, W1, and W2 when the connections of the stator coils U1, U2, V1, V2, W1, and W2 is switched from the serial connection to the parallel connection. Besides, in FIG. 8, the switching of the connection of the stator coils U1 and U2 by the U phase connection switching section 34U is explained as a representative.

When the stator coils U1 and U2 are connected in serial with each other, the parallel connection switching sections E1, E2, F1, and F2 are brought to the OFF state. On the other hand, the serial connection switching sections G1 and G2 are brought to the ON state. In this case, the current flows through the first stator coil U1, the serial connection switching sections G1 and G2, and the second stator coil U2 to the neutral point 37 (cf. the broken arrow in FIG. 6).

Then, based on the driving information from the various sensors, the serial connection switching sections G1 and G2 are switched from the ON state to the OFF state at time t1. Moreover, the parallel connection switching sections E1, E2, F1, and F2 are switched from the OFF state to the ON state at time t2. With this, the stator coils U1 and U2 are connected in parallel with each other. In this case, the current flows through the first stator coil U1, and the parallel connection switching sections E2 and F2 to the neutral point 37. Moreover, the current flows through the parallel connection switching sections E1 and E2 and the second stator coil U2 to the neutral point 37 (cf. the solid arrow in FIG. 6).

Besides, it is also possible to apply the control of the current shown in FIG. 7(b) to the switching from the serial connection to the parallel connection in FIG. 8.

Effects of First Embodiment

In the three phase brushless motor described in the patent document 1, the stator coils provided in the respective phases are connected by the star connection. The current flowing among the phases, and the line resistances are constant.

Moreover, in the three phase brushless motor, the torque is inversely proportional to the rotation speed. Accordingly, in a case where the high torque is needed, the motor is used to sacrifice the high rotation speed. On the other hand, in a case where the high rotation speed Is needed, the motor is used to sacrifice the high rotation speed. Consequently, in the brushless motor in the conventional art, it is problematic that only one of the high torque characteristics and the high rotation speed characteristics is used by the single brushless motor.

On the other hand, in the first embodiment, the motor 1 includes the motor rotor 23; the stator coil section 25 including a plurality of energization phases; first stator coils U1, V1, and W1 and second stator coils U2, V2, and W2 which are provided to the respective phases; the stator coil section 25 configured to generate the magnetic field, and thereby to rotate the motor rotor 23; and connection switching sections 34U, 34V, and 34W configured to switch the connections of the first stator coils U1, V1, and W1 and the second stator coils U2, V2, and W2 from the serial connection to the parallel connection, or from the parallel connection to the serial connection.

In this way, in the motor 1 according to the first embodiment, the first stator coil U1 and the second stator coil U2 are disposed in the U phase. The first stator coil V1 and the second stator coil V2 are disposed in the V phase. The first stator coil W1 and the second stator coil W2 are disposed in the W phase. In each phase, the connection of the two stator coils is switched between the serial connection and the parallel connection. With this, by switching from the parallel connection to the serial connection as described above, the current flowing in the stator coils U1, V1, W1, U2, V2, and W2 becomes twice. The line resistance between the two phases becomes quadruple. Accordingly, in the serial connection, the torque calculated from the product of the current and the winding number of the stator coil becomes twice. The rotation speed based on the line resistance becomes smaller.

Accordingly, in the motor 1 according to the first embodiment, the connection of the stator coils U1, V1, W1, U2, V2, and W2 are switched between the serial connection and the parallel connection in accordance with the usage condition of the vehicle. With this, it is possible to appropriately select and use the high torque characteristics and the high rotation speed characteristics by the single motor 1.

Moreover, in the first embodiment, the both end portions U1a, U1b, V1a, V1b, W1a, and W1b of the first stator coils U1, V1, and W1, and the both end portions U2a, U2b, V2a, V2b, W2a, and W2b of the second stator coils U2, V2, and W2 are provided on the same side of the motor rotor 23 in the direction of the rotation axis of the motor rotor 23.

Accordingly, the connections of the both end portions U1a, U1b, V1a, V1b, W1a, W1b, U2a, U2b, V2a, V2b, W2a, and W2b, and the switching sections E1, E2, F1, F2, G1, and G2 are collected on the one side in the rotation axis of the motor 1. Accordingly, it is possible to readily perform the connection operation.

Furthermore, in the first embodiment, the motor 1 includes the energization control section 28 which includes the plurality of the switching elements, and which is configured to perform the energization control of the stator coil section 25. The connection switching sections 34U, 34V, and 34W includes switching sections E1, E2, F1, F2, G1, and G2. The switching elements of the energization control section 28 and the switching sections E1, E2, F1, F2, G1, and G2 of the connection switching sections 34U, 34V, and 34W are mounted in the same package module.

Accordingly, it is possible to ease the connection and the layout of the electric circuit including the switching sections and the switching elements which are the field effect transistors.

Moreover, in the first embodiment, the connection switching sections 34U, 34V, and 34W include the serial connection switching sections G1 and G2 configured to be brought to the energization state to connect the first stator coils U1, V1, and W1 and the second stator coils U2, V2, and W2 in serial with each other; and the parallel connection switching sections E1, E2, F1, and F2 configured to be brought to the energization state to connect the first stator coils U1, V1, and W1 and the second stator coils U2, V2, and W2 in parallel with each other. When the connections of the first stator coils U1, V1, and W1 and the second stator coils U2, V2, and W2 is switched from the parallel connection to the serial connection, the serial connection switching sections G1 and G2 are brought to the energization state after the parallel connection switching sections E1, E2, F1, and F2 are brought to the deenergization state.

If the deenergization state of the parallel connection switching sections E1, E2, F1, and F2 and the energization state of the serial connection switching sections G1 and G2 are at the same time, it becomes short-circuit state. The current does not flow the stator coils U1, V1, W1, U2, V2, and W2. The current directly flow through the switching sections E1, E2, G1, G2, F1, and F2 to the neutral point 37. That is, the through-current is generated. With this, the motor 1 may be deteriorated. Accordingly, in this first embodiment, the deenergization state of the parallel connection switching sections E1, E2, F1, and F2 and the energization state of the serial connection switching sections G1 and G2 are at the different timings. With this, it is possible to suppress the through-current, and to suppress the deterioration of the motor 1.

Moreover, in the first embodiment, the connection switching sections 34U, 34V, and 34W includes the serial connection switching sections G1 and G2 configured to be brought to the energization state to connect the first stator coils U1, V1, and W1 and the second stator coils U2, V2, and W2 in serial with each other; and the parallel connection switching sections E1, E2, F1, and F2 configured to be brought to the energization state to connect the first stator coils U1, V1, and W1 and the second stator coils U2, V2, and W2 in parallel with each other. When the connections of the first stator coils U1, V1, and W1 and the second stator coils U2, V2, and W2 is switched from the serial connection to the parallel connection, the parallel connection switching sections E1, E2, F1, and F2 are brought to the energization state after the serial connection switching sections G1 and G2 are brought to the deenergization state.

If the deenergization state of the serial connection switching sections G1 and G2 and the energization state of the parallel connection switching sections E1, E2, F1, and F2 are at the same time, it becomes short-circuit state. The current does not flow the stator coils U1, V1, W1, U2, V2, and W2. The current directly flow through the switching sections E1, E2, G1, G2, F1, and F2 to the neutral point 37. That is, the through-current is generated. With this, the motor 1 may be deteriorated. Accordingly, in this first embodiment, the deenergization state of the serial connection switching sections G1 and G2 and the energization state of the parallel connection switching sections E1, E2, F1, and F2 are at the different timings. With this, it is possible to suppress the through-current, and to suppress the deterioration of the motor 1.

Furthermore, in the first embodiment, the motor includes the energization control section 28 configured to the energization control of the stator coil section 25. The energization control section 28 is configured to vary the energization amount to the stator coil section 25 when the connection switching sections 34U, 34V, and 34W switch the connections of the first stator coil U1, V1, and W1 and the second stator coils U2, V2, and W2 from the serial connection to the parallel connection, or from the parallel connection to the serial connection.

As described above, the torque of the motor 1 becomes twice by the switching from the parallel connection to the serial connection. Accordingly, the sudden torque variation is generated at the switching of the connection, so that the steering feeling is deteriorated. Consequently, by adjusting the torque by varying the energization amount of the stator coils U1, V1, W1, U2, V2, and W2, it is possible to suppress the sudden torque variation, and to perform the smooth assist control.

Furthermore, in the first embodiment, the energization control section 28 is configured to gradually vary from the target value $I_0$ of the energization before the switching, to the target value $I_0/2$ of the energization after the switching when the connection switching sections 34U, 34V, and 34W switches the connection of the first stator coils U1, V1, and W1 and the second stator cols U2, V2, and W2 from the serial connection to the parallel connection, or from the parallel connection to the serial connection.

If the control amount of the current is maintained to $I_0$ at time t3, the torque is suddenly increased twofold, so that the steering feeling may be deteriorated. Accordingly, the control amount of the current is set to $I_0/2$ at time t3. With this, it is possible to smoothly perform the connection while maintaining the torque to $T_0$, and to suppress the deterioration of the steering torque due to the sudden torque variation at the switching of the connection.

Therefore, it is possible to suppress the sudden torque variation at the switching of the connection, and to output the necessary torque after the switching of the connection.

Moreover, in the first embodiment, the motor 1 is the brushless moor for the power steering device which is arranged to provide the steering force to the steered wheels 6 and 6 of the vehicle.

Accordingly, it is possible to perform the motor control appropriate for the steering state, between the steering state using the high rotation speed of the motor 1, and the steering state using the high torque of the motor 1.

Furthermore, in the first embodiment, the connection switching sections 34U, 34V, and 34W are configured to switch the connection of the first stator coils U1, V1, and W1 and the second stator coils U2, V2, and W2 in accordance with the vehicle speed Vs.

Accordingly, the parallel connection is used from the middle vehicle speed region to the high vehicle speed region in which the large assist force is not needed. The serial connection is used in the low vehicle speed region in which the large assist force is needed, for example, at the parking (garaging). With this, it is possible to select the connection appropriate for the steering state.

Moreover, in the first embodiment, the connection switching sections 34U, 34V, and 34W are configured to switch the connections of the first stator coils U1, V1, and W1 and the second stator coils U2, V2, and W2 in accordance with the steering torque Tr.

In this way, the connection of the first stator coils U1, V1, and W1 and the second stator coils U2, V2, and W2 are switched based on the steering torque Tr sensed by the torque sensor 16 of the electric power steering device 2. With this, it is possible to select the connection according to the necessary torque.

Furthermore, in the first embodiment, the connection switching sections 34U, 34V, and 34W are configured to switch the connections of the first stator coils U1, V1, and W1 and the second stator coils U2, V2, and W2 in accordance with the steering speed.

In this way, the connection of the first stator coils U1, V1, and W1 and the second stator coils U2, V2, and W2 are switched in accordance with the steering speed calculated based on the output from the steering angle sensor 15 of the electric power steering device 2, the rotation angle sensor of the motor 1, and so on. With this, it is possible to select the connection according to the necessary steering response.

Moreover, in the first embodiment, the motor 1 includes the energization control section 28 which includes the plurality of the switching elements, and which is configured to perform the energization control. The connection switching sections 34U, 34V, and 34W are configured to switch the connection of the first stator coils U1, V1, and W1 and the second stator coils U2, V2, and W2 in accordance with the heating amount of the switching elements.

In this way, the connection of the first stator coils U1, V1, and W1 and the second stator coils U2, V2, and W2 is switched in accordance with the heating amount of the switching elements. With this, it is possible to suppress the overheating of the switching elements. In this case, the heating amount of the switching elements in the serial connection is smaller than the heating amount of the switching elements in the parallel connection. Accordingly, when the heating amount is large and the temperature of the inverter is increased, it is possible to suppress the overheating of the switching elements by the switching from the parallel connection to the serial connection.

Second Embodiment

Figure 9:
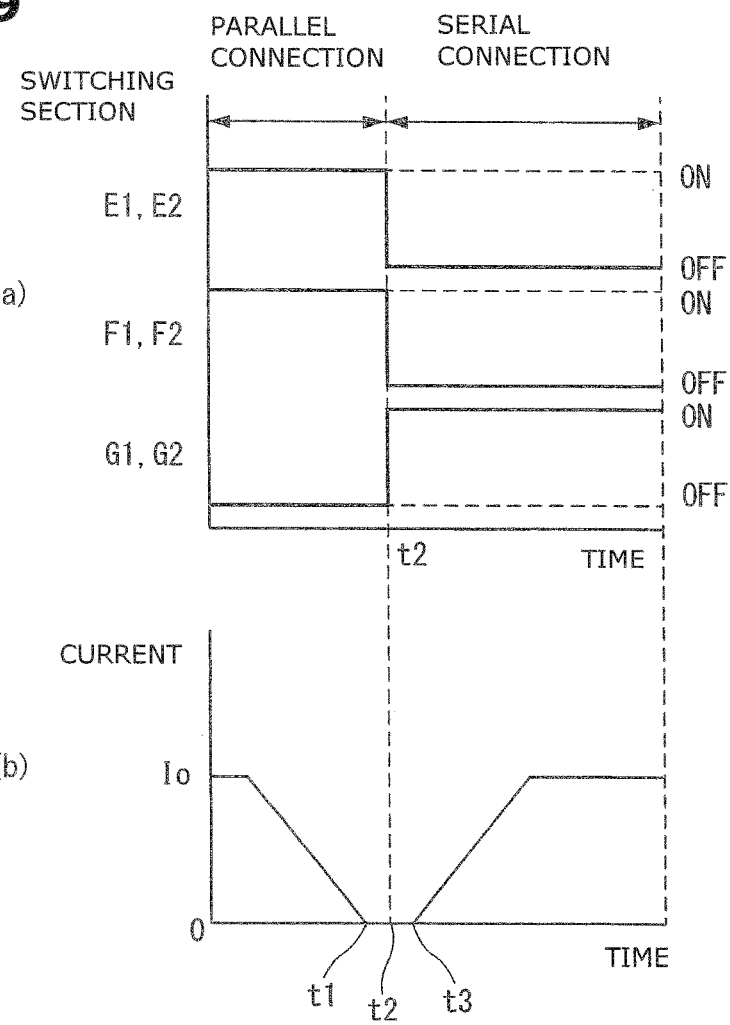
FIG. 9(a) is an explanation view showing a control of the switching section in a second embodiment when the connection of the switching section in the second embodiment when the connection of the stator coil is switched from the parallel connection to the serial connection.
FIG. 9(b) is a graph showing variation of the current at the switching from the parallel connection to the serial connection.

FIG. 9(a) is an explanation view showing a control of the switching sections E1, E2, F1, F2, G1, and G2 when the connection of the stator coils U1, U2, V1, V2, W1, and W2 is switched from the parallel connection to the serial connection in a second embodiment. In FIG. 9(a), the switching of the connection of the stator coils U1 and U2 by the U phase connection switching section 34U is explained as a representative.

When the stator coils U1 and U2 are connected in parallel with each other, the parallel connection switching sections E1, E2, F1, and F2 are in the ON state. On the other hand, the serial connection switching sections G1 and G2 are in the OFF state. In this case, the current flows through the first stator coil U1 and the parallel connection switching sections E2 and F2 to the neutral point 37. Moreover, the current flows through the parallel connection switching sections E1 and F1 and the second stator coil U2 to the neutral point 37 (cf. the solid arrow in FIG. 6).

Then, based on the driving Information from the various sensors, the parallel connection switching sections E1, E2, F1, and F2 are switched from the ON state to the OFF state at time t2. Moreover, the serial connection switching sections G1 and G2 are switched from the OFF state to the ON state at time t2. In this case, the current flows through the first stator coil U1, the serial connection switching sections G1 and G2, and the second stator coil U2 to the neutral point 37 (cf. the broken arrow in FIG. 6).

FIG. 9(b) is a graph showing a variation of the current flowing in the serial/parallel switching circuit 32 when the connections of the stator coils U1 and U2 is switched from the parallel connection to the serial connection.

As shown in FIG. 9(b), in the parallel connection, the energization control section 28 controls the current $I_0$ flowing in the stator coils U1 and U2 to 0A at time t1. 0A is maintained until time t3. Then, after the switching from the parallel connection to the serial connection, the energization control section 28 increases the current to $I_0$ in the serial connection. $I_0$ is held.

Figure 10:
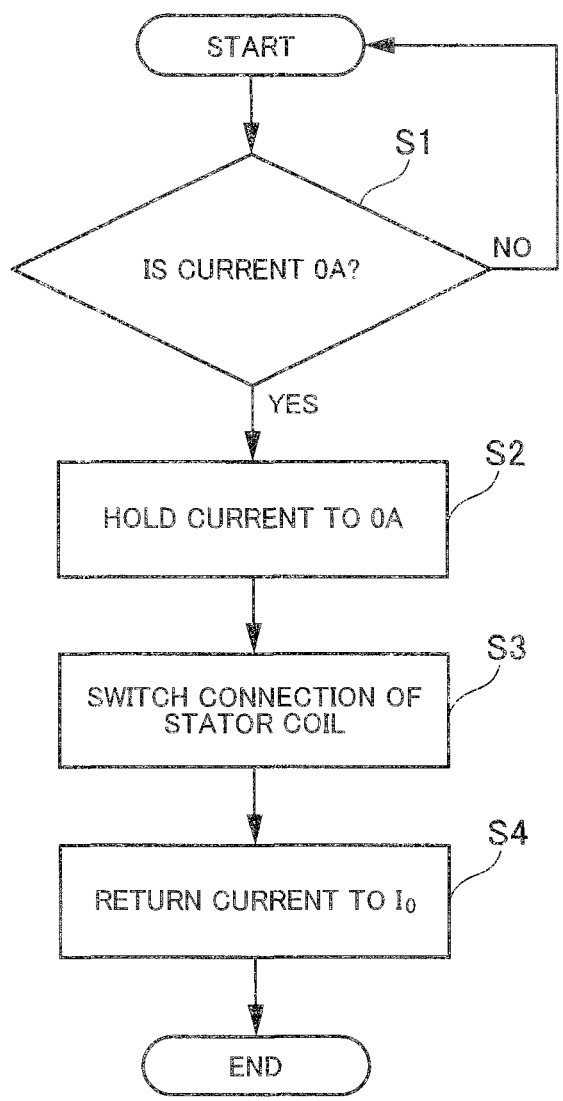
FIG. 10 is a flowchart showing the switching control of the stator coil in the second embodiment.

FIG. 10 is a flowchart showing the switching control of the stator coils U1, U2, V1, V2, W1, and W2 in the second embodiment.

At step S1, in the parallel connection of the stator coils U1, U2, V1, V2, W1, and W2, it is judged whether or not the current flowing in these stator coils is 0A. That is, it is judged whether or not the current Is decreased from $I_0$ to 0A by the energization control section 28. When the current is not 0A, the judgment of step S1 is continued.

When the current is 0A, at step S2, the current I is held to 0A from time t1 to time t3 (cf. FIG. 9(b)).

Then, at step S3, the switching sections E1, E2, F1, F2, G1, and G2 switches the connection of the stator coils U1, U2, V1, V2, W1, and W2 from the parallel connection to the serial connection, in the state where the current is held to 0A at time t2 (cf. FIG. 9(b)).

Next, at step S4, in the serial connection, the energization control section 28 returns the current I from 0A to $I_0$.

[Effects of Second Embodiment]

In the second embodiment, the motor 1 includes the energization control section 18 configured to perform the energization control of the stator coil section 25. The connection switching sections 34U, 34V, and 34W switches the connection of the first stator coils U1, V1, and W1 and the second stator coils U2, V2, and W2 when the energization control section 28 is 0A.

With this, the current does not flow directly through the switching sections E1, E2, G1, G2, F1, and F2 to the neutral point 37 at the switching of the connection. That is, the through-current is not generated. Accordingly, it is possible to suppress the shock (the switching shock) according to the switching.

Third Embodiment (Configuration of Brushless Motor of Two Systems)

Figure 11:
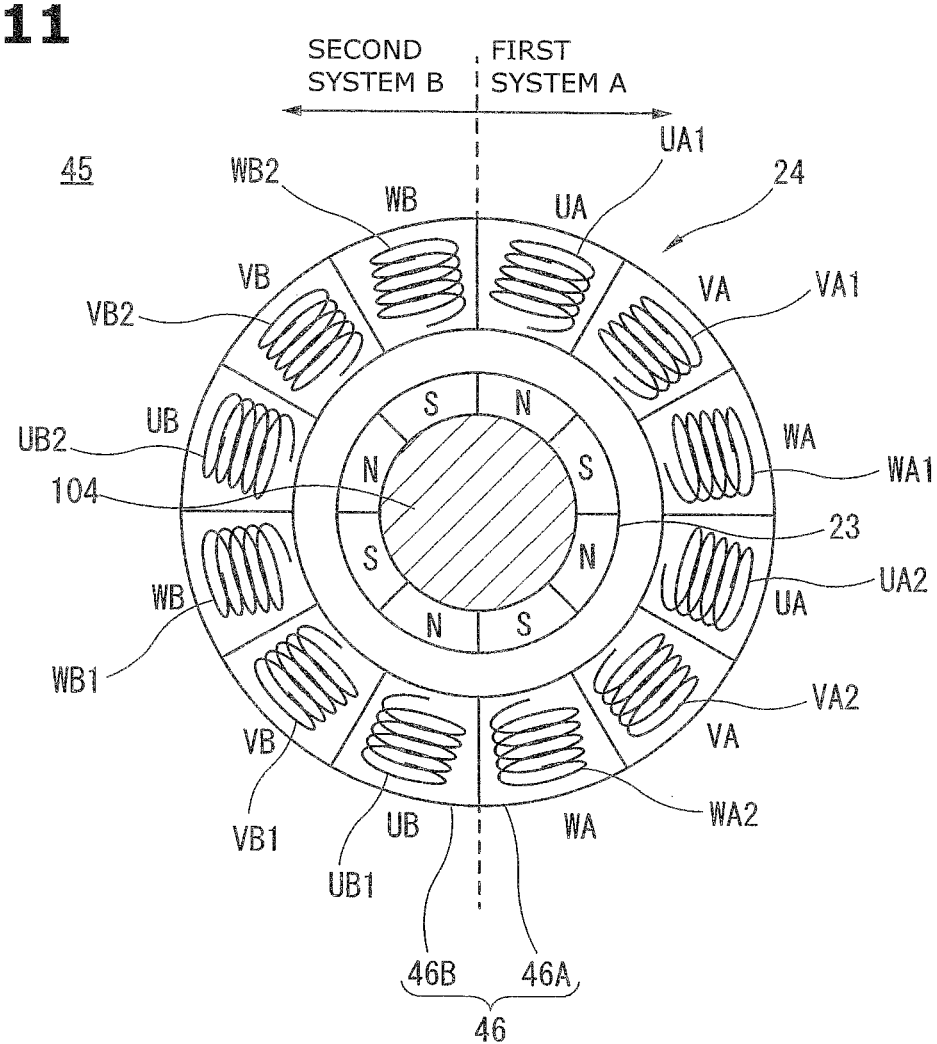
FIG. 11 is a schematic sectional view showing the motor of two systems in a third embodiment.

FIG. 11 is a schematic sectional view which is taken along the motor radial direction, and which shows a motor 45 of two systems (two circuits) in a third embodiment.

The motor 45 is a three phase brushless motor having two systems. The motor 45 includes the motor rotor 23 and the motor stator 24.

In this embodiment, as shown in FIG. 11, one half portion of the motor 45 (a half portion on a right side in FIG. 11) is defined as "first system A". The other half portion of the motor 45 (a half portion on a left side in FIG. 11) is defined as "second system B". The first system A and the second system B of the motor 45 are combined and used in accordance with the usage condition of the vehicle. Alternatingly, in case where one of the first system A and the second system B of the motor 45 is malfunctioned, the other of the first system A and the second system B is used as a backup.

Moreover, the motor rotor 23 includes a stator coil section 46 having three energization phases, that is, the U phase, the V phase, and the W phase. The stator coil section 46 includes a first system stator coil section 46A in which stator coils UA1, UA2, VA1, VA2, WA1, and WA2 for the first system A are disposed; and a second system stator coil section 46B in which stator coils UB1, UB2, VB1, VB2, WB1, and WB2 for the second system B are disposed. The stator coils UA1, UA2, VA1, VA2, WA1, WA2, UB1, UB2, VB1, VB2, WB1, and WB2 have the identical function.

In this embodiment, the U phase, the V phase, and the W phase of three energization phases of the motor rotor 23 which are used in the first system A is referred to as "UA phase", "VA phase", and "WA phase". The U phase, the V phase, and the W phase of three energization phases of the motor rotor 23 which are used in the second system B is referred to as "UB phase", "VB phase", and "WB phase".

As shown in FIG. 11, in the first system A, the UA phase, the VA phase, and the WA phase are disposed in an order of the UA phase, the VA phase, the WA phase, the UA phase, the VA phase, and the WA phase in a clockwise direction in FIG. 11 at an interval of 30 degrees. In the UA phase, the VA phase, the WA phase, the UA phase, the VA phase, and the WA phase, the stator coils UA1, VA1, WA1, UA2, VA2, and WA2 are wound around corresponding teeth portions, as shown in FIG. 11.

Moreover, as shown in FIG. 11, in the second system B, the UB phase, the VB phase, and the WB phase are disposed in an order of the UB phase, the VB phase, the WB phase, the UB phase, the VB phase, and the WB phase in a clockwise direction in FIG. 11 at an interval of 30 degrees. In the UB phase, the VB phase, the WB phase, the UB phase, the VB phase, and the WB phase, the stator coils UB1, VB1, WB1, UB2, VB2, and WB2 are wound around corresponding teeth portions, as shown in FIG. 11.

The first system first stator coils UA1, VA1, and WA1 and the first system second stator coils UA2, VA2, and WA2 are electrically connected by the star connection (the Y connection) similarly to the parallel connection of FIG. 4(a) or the serial connection of FIG. 5(a).

The second system first stator coils UB1, VB1, and WB1 and the second system second stator coils UB2, VB2, and WB2 are electrically connected by the star connection (the Y connection) similarly to the parallel connection of FIG. 4(a) or the serial connection of FIG. 5(a).

Besides, the first system stator coil section 46A and the second system stator coil section 46B correspond to "first stator coil section" and "second stator coil section" in claims. Moreover, the first system first stator coils UA1, VA1, and WA1 and the first system second stator coils UA2, VA2, and WA2 correspond to "first first stator coil" and "first second stator coil" in claims. Similarly, the second system first stator coils UB1, VB1, and WB1 and the second system second stator coils UB2, VB2, and WB2 correspond to "second first stator coil" and "second second stator coil" in the claims.

Furthermore, the combination of the first system first stator coils UA1, VA1, and WA1 and the second system first stator coils UB1, VB1, and WB1 is conceivable as "first stator coil" in the claims. Similarly, the combination of the first system second stator coils UA2, VA2, and WA2, and the second system second stator coils UB2, VB2, and WB2 is conceivable as "second stator coil" in the claims.

Figure 12:
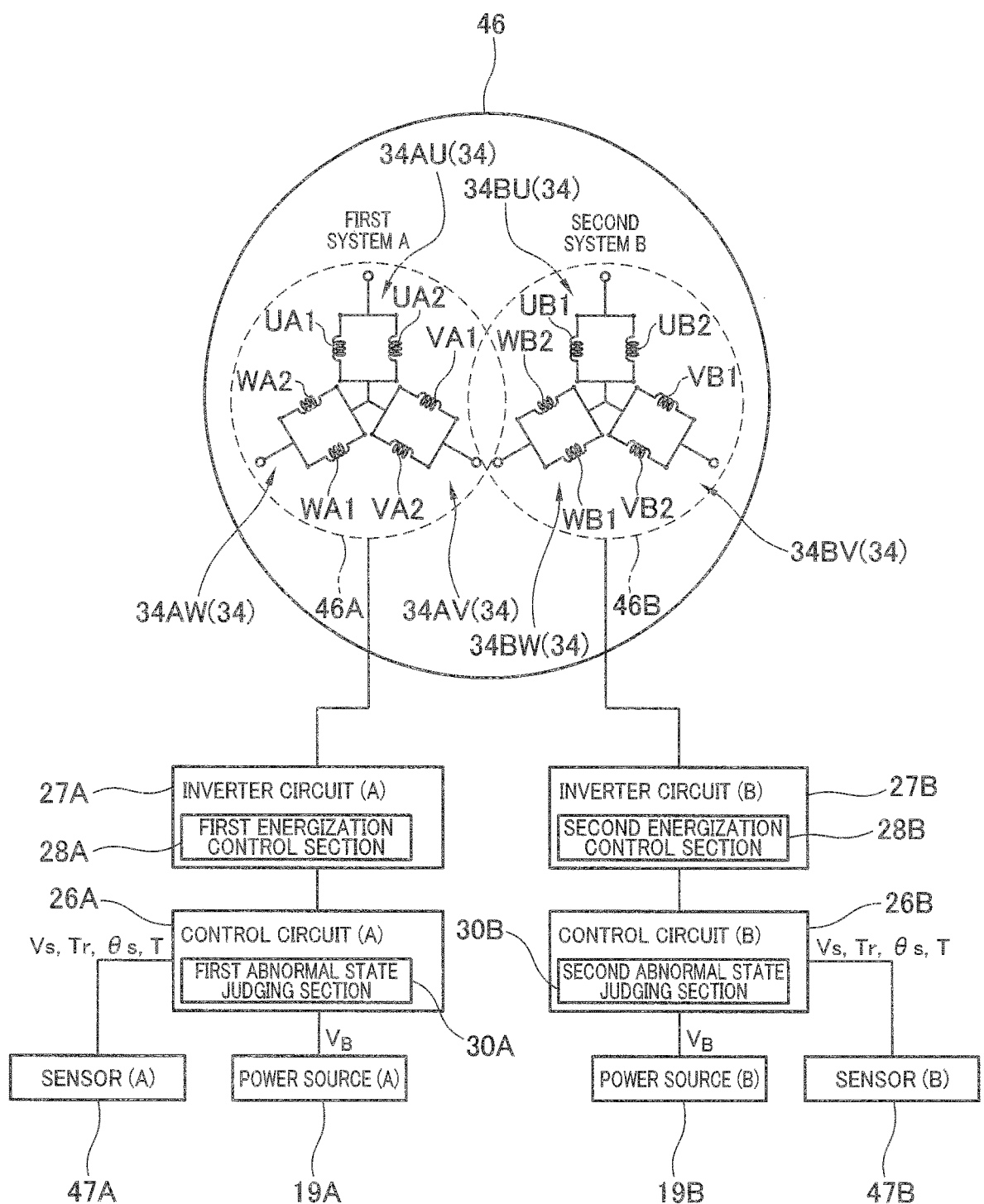
FIG. 12 is a control block diagram of the motor in the third embodiment.

FIG. 12 is a control block diagram showing the motor 45 of the two systems in the third embodiment.

In the first system stator coil section 46A, the first system first stator coils UA1, VA1, and WA1, and the first system second stator coils UA2, VA2, and WA2 are connected in parallel with each other.

On the other hand, in the second system stator coil section 46B, the second system first stator coils UB1, VB1, and WB1, and the second system second stator coils UB2, VB2, and WB2 are connected in parallel with each other.

The control device 17 includes, in the first system A, a control circuit 26A and an inverter circuit 27A for the first system A which are identical to the control circuit 26 and the inverter circuit 27 in the first embodiment.

The control circuit 26A is constituted by a circuit board, a microcomputer, and so on. The control circuit 26A is electrically connected to a sensor 47A for the first system A. In this case, the sensor 47A is a general term for the various sensor connected to the control circuit 26A in the first system A. The sensor 47A includes the vehicle sensor 18, the torque sensor 16, the steering angle sensor 15, and the temperature sensor 29 which are identical to those in the first embodiment. The control circuit 26A receives the electric power Va from the power source 19A for the first system.

Moreover, the control circuit 26A includes a first abnormal state judging section 30A configured to judge whether or not it is possible to perform the energization control in the first system stator coil section 46A in the normal state.

The inverter circuit 27A Includes a first energization control section 28A. The first energization control section 28A is configured to appropriately switch the ON state and the OFF state of a plurality of switching elements (not shown), for example, the MOS transistors (MOS-FETs) which are the field effect transistors, and thereby to perform the energization control of the first system stator coil section 46A.

The inverter circuit 27A includes a connection switching section 34. This connection switching section 34 a first system U phase connection switching section 34AU, a first system V phase connection switching section 34AV, and a first system W phase connection switching section 34AW which are identical to the U phase connection switching section 34U, the V phase connection switching section 34V, and the W phase connection switching section 34W in the first embodiment. These connection switching sections 34AU, 34AV, and 34Aw are configured to switch the connections of the first system first stator coils UA1, VA1, and WA1 and the first system second stator coils UA2, VA2, and WA2 between the serial connection and the parallel connection.

Similarly to the first system A, the control device 17 includes a control circuit 26 and an inerter circuit 27 for the system B which are identical to the control circuit 26B and the inverter circuit 27B in the first embodiment.

Moreover, similarly to the first system A, in the second system B, there are provided a sensor 47B, a power source 19B, a second abnormal state judging section 28B, a second energization control section 28B, a second system U phase connection switching section 34BU, a second system V phase connection switching section 34BV and a second system W phase connection switching section 34BW which are identical to the sensor 47A, the power source 19A, the first abnormal state judging section 30A, the first energization state control section 28A, the connection switching sections 34AU, 34AV, and 34AW.

Besides, the first system U phase connection switching section 34AU, the first system V phase connection switching section 34AV, and the first system W phase connection switching section 34AW correspond to "first connection switching section" in the claims. The second system U phase connection switching section 34BU, the second system V phase connection switching section 34BV, and the second system W phase connection switching section 34BW correspond to "second connection switching section" in the claims.

Figure 13:
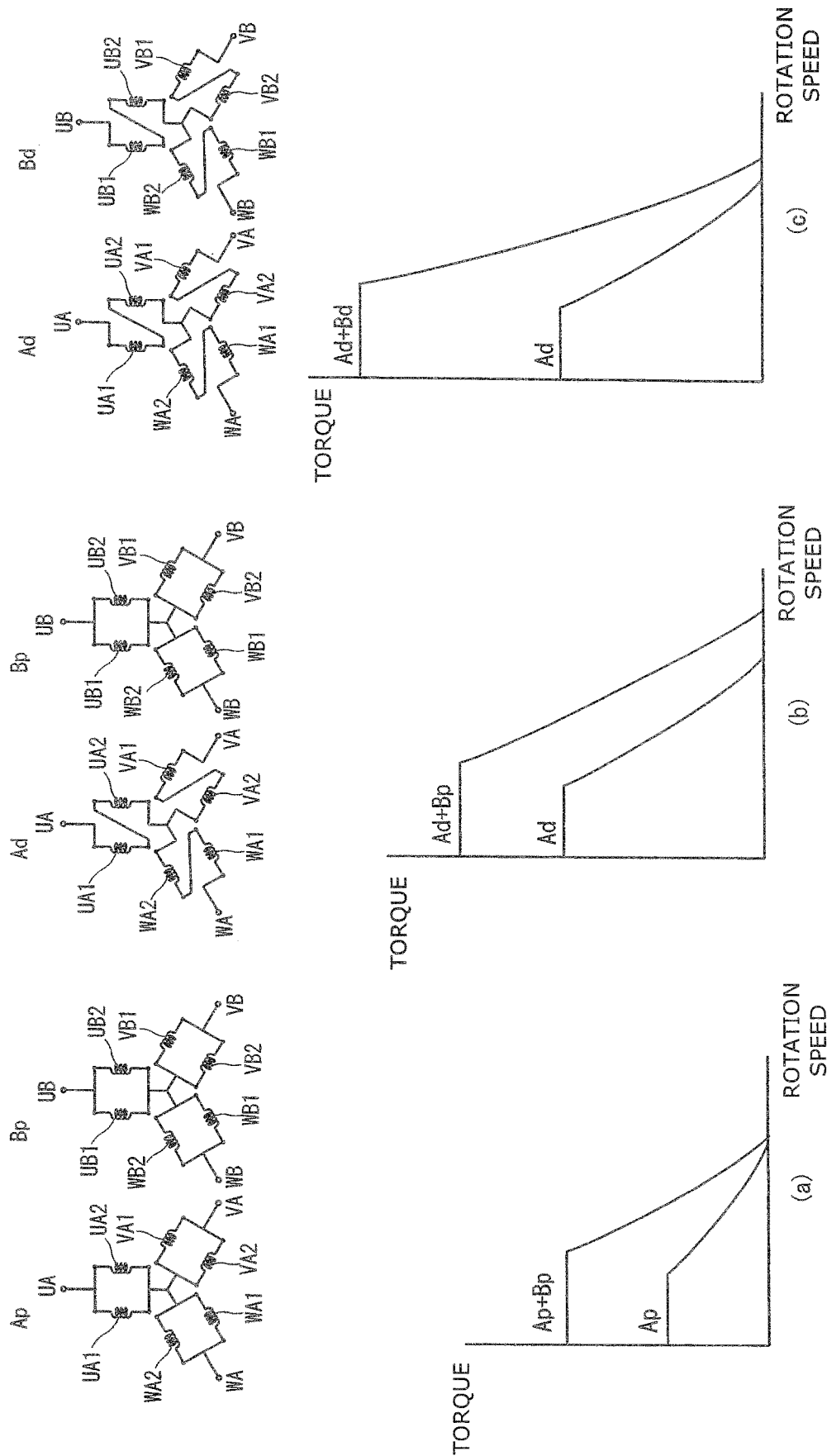
FIG. 13(a) is a connection view and a graph showing characteristics of the motor when a first system A and a second system B are the parallel connection.
FIG. 13(b) is a connection view and a graph showing characteristics of the motor when the first system A is the serial connection, and the second system B is the parallel connection.
FIG. 13(c) is a connection view and a graph showing characteristics of the motor when the first system A and the second system B are the serial connection.

Next, a case where the first system A and the second system B of the motor 45 are combined and used Is explained with reference to FIG. 13.

FIG. 13(a) is a graph showing a relationship between the torque and the rotation speed of the motor 45 when the first system A and the second system B are in the parallel connection, and showing a relationship between the torque and the rotation speed of the motor 45 when the only first system A is used.

FIG. 13(b) is a graph showing a relationship between the torque and the rotation speed of the motor 45 when the first system A is in the serial connection and the second system B is in the parallel connection, and showing a relationship between the torque and the rotation speed of the motor 45 when the first system A In the serial connection is used.

FIG. 13(c) is a graph showing a relationship between the torque and the rotation speed of the motor 45 when the first system A and the second system B are in the serial connection, and showing a relationship between the torque and the rotation speed of the motor 45 when the first system A in the serial connection is used.

Besides, FIG. 13(a) to FIG. 13(c) show, respectively, above the graphs, line connection diagrams of the stator coils UA1, VA1, WA1, UA2, VA2, and WA2 in the first system A, and line connection diagrams of the stator UB1, VB1, WB1, UB2, VB2, and WB2 in the second system B.

In FIG. 13(a) to FIG. 13(b), "first system Ap of parallel connection" represents a case where the stator coils UA1, VA1, WA1, UA2, VA2, and WA2 are connected in parallel with each other in the first system A. "Second system Bp of parallel connection" represents a case where the stator coils UB1, VB1, WB1, UB2, VB2, and WB2 are connected in parallel with each other in the second system B. "First system Ad of serial connection" represents a case where the stator coils UA1, VA1, WA1, UA2, VA2, and WA2 are connected in serial with each other in the first system A. "Second system Bp of serial connection" represents a case where the stator coils UB1, VB1, WB1, UB2, VB2, and WB2 are connected in serial with each other in the second system B.

In FIG. 13(a), the first system Ap of the parallel connection and the second system Bp of the parallel connection which have the identical configuration attain the torque which is double of the torque when the only first system Ap of the parallel connection is used. The example shown in FIG. 13(a) is employed in the traveling of the vehicle in the normal state, for example, when the high torque characteristics and the high rotation speed characteristics are not needed.

In FIG. 13(b), the first system Ad of the serial connection in which the torque of the motor 45 is high, and the second system Bp of the parallel connection can obtain the torque higher than the combination of the systems Ap and Bp of FIG. 13(a). Moreover, the first system Ad of the serial connection and the second system Bp of the parallel connection can obtain the torque higher than the torque when the only first system Ad of the serial connection is used. The example shown in FIG. 13(b) is employed when the high torque characteristics of the motor 45 is needed, for example, when many occupants gets on the vehicle, when much carriages are loaded, when the air pressure of the tire is low, when the vehicle travels on the inclination road, and when the friction coefficient of the road surface is high.

In FIG. 13(c), the first system Ad of the serial connection in which the torque of the motor 45 is high, and the second system Bd of the serial connection in which the torque of the motor 45 is high can obtain the torque higher than the torque of the combination of the systems Ad and Bp in FIG. 13(b). Moreover, the first system Ad of the serial connection and the second system Bd of the serial connection can obtain the torque higher than the torque when the only first system Ad of the serial connection is used. The example shown in FIG. 13(c) is employed when the high torque characteristics higher than that of the example of FIG. 13(b) is needed, for example, when many occupants gets on the vehicle and much carriages are loaded, that is, when the above-described plurality of conditions are satisfied.

Figure 14:
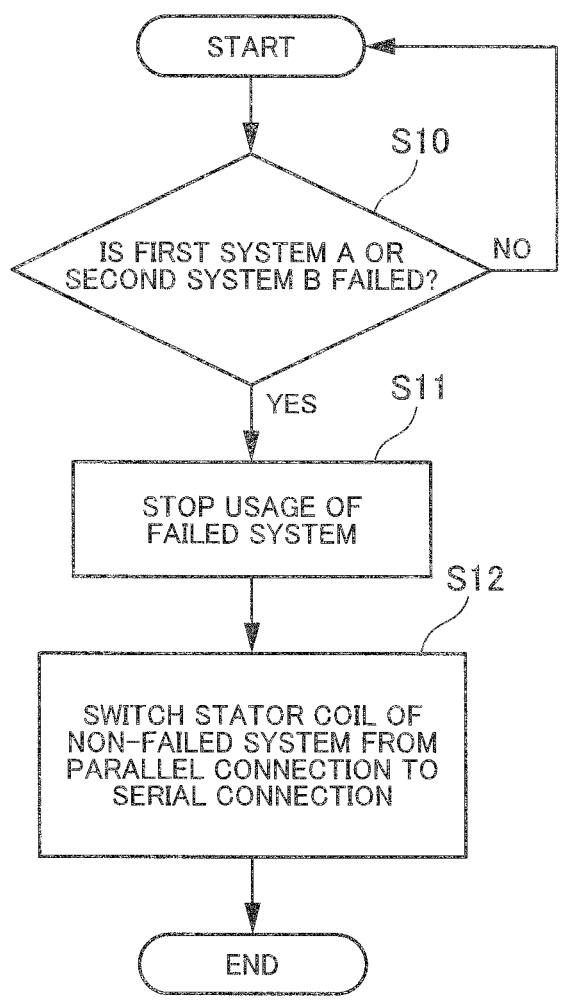
FIG. 14 is a flowchart showing a method of switching the connection of the systems when one of the systems is malfunctioned.

FIG. 14 is a flowchart showing the switching method of the system when one of the first system A and the second system B is failed (malfunctioned).

In FIG. 14, the first system A and the second system B are in the serial connection. That is, the first system A and the second system B are connected as shown in FIG. 13(a).

At step S10, the first and second abnormal state judging sections 30A and 30B judge whether or not the first system A or the second system B is failed (malfunctioned). The first and second abnormal state judging sections 30A and 30B performs this judgment by judging, for example, the disconnection (breaking) of the stator coils UA1, VA1, WA1, UA2, VA2, WA2, UB1, VB1, WB1, UB2, VB2, and WB2, the malfunction of the switching element, the malfunction of the microcomputer configured to control the switching elements, the malfunction of the control circuit 26, and so on.

When the first system A or the second system B is not failed (malfunctioned), that is, when both of the first system A and the second system B is operated in the normal state, the judgment of step S10 is continued.

On the other hand, when the first system A or the second system B is failed, at step S11, the usage of the failed system is stopped.

Then, at step S12, the stator coils of the non-failed system (which is not failed) is switched from the parallel connection to the serial connection.

For example, when the first system A is failed, the connections of the stator coils UB1, VB1, WB1, UB2, VB2, and WB2 of the non-failed second system B are switched from the parallel connection (cf. the connection of the second system B of FIG. 13(a)) to the serial connection (cf. the connection of the second system B of FIG. 13(c)) by the switching sections E1, E2, F1, F2, G1, and G2. By this switching, the torque of the motor 45 becomes twice. In this way, in the second system B which is not failed, the second energization control section 28B continuously controls the motor 45.

On the other hand, when the second system B is failed, the connections of the stator coils UA1, VA1, WA1, UA2, VA2, and WA2 of the non-failed first system B are switched from the parallel connection (cf. the connection of the first system A of FIG. 13(a)) to the serial connection (cf. the connection of the first system A of FIG. 13(c)) by the switching sections E1, E2, F1, F2, G1, and G2. By this switching, the torque of the motor 45 becomes twice. In this way, in the first system A which is not failed, the first energization control section 28A continuously controls the motor 45.

Effects of Third Embodiment

In the third embodiment, the stator coil section 46 includes the first system stator coil section 46A and the second system stator coil section 46B. The first stator coil includes the stator coils UA1, VA1, and WA1 provided to the first system stator coil section 46A, and the stator coils UB1, VB1, and WB1 provided to the second system stator coil section 46B. The second stator coil Includes the stator coils UA2, VA2, and WA2 provided to the first system stator coil section 46A, and the stator coils UB2, VB2, and WB2 provided to the second system stator coil section 46B. The connection switching section 34 includes the connection switching sections 34AU, 34AV, and 34AW configured to switch the connections of the stator coils UA1, VA1, and WA1 and the stator coils UA2, VA2, and WA2 from the serial connection to the parallel connection, or from the parallel connection to the serial connection; and the connection switching sections 34BU, 34BV, and 34BW configured to switch the connections of the stator coils UB1, VB1, and WB1 and the stator coils UB2, VB2, and WB2 from the serial connection to the parallel connection, or from the parallel connection to the serial connection.

Accordingly, when the high torque characteristics is needed in the motor 45, the connections of the first system stator coil section 46A and the second stator coil section 46B are appropriately combined and energized. When one of the stator coil sections is failed, the non-failed stator coil section is energized. With this, it is possible to perform the motor control in accordance with the usage condition.

Moreover, in the third embodiment, the motor 45 includes the energization control section including the first energization control section 28A configured to perform the energization control of the first system stator coil section 46A, and the second energization control section 28B configured to perform the energization control of the second system stator coil section 46B; the first abnormal state judging section 30A configured to judge whether or not the energization control of the first system stator coil section 46A is performed in the normal state; and the second abnormal state judging section 30B configured to judge whether or not the energization control of the second system stator coil section 46B is performed in the normal state; and when the first abnormal state judging section 30A and the second abnormal state judging section 30B judges that one of the first system stator coil section 46A and the second system stator coil section 46B is in the abnormal state, the energization control section continuously controls the other of the first system stator coil section 46A and the second system stator coil section 46B.

Accordingly, when one of the stator coil sections is failed, the other of the stator coil sections which is not failed is continuously controlled. With this, it is possible to is improve the convenience of the user.

Besides, in a state where the stator coil sections 46A and 46B are in the parallel connections, when one of the stator coil sections is failed and the other of the stator coil sections is switched from the parallel connection to the serial connection to operate the motor 45, the torque becomes twice by the switching from the parallel connection to the serial connection. Accordingly, it is possible to operate the motor 45 without decreasing the torque after the malfunction.

Fourth Embodiment (Configuration of Steer-By-Wire)

Figure 15:
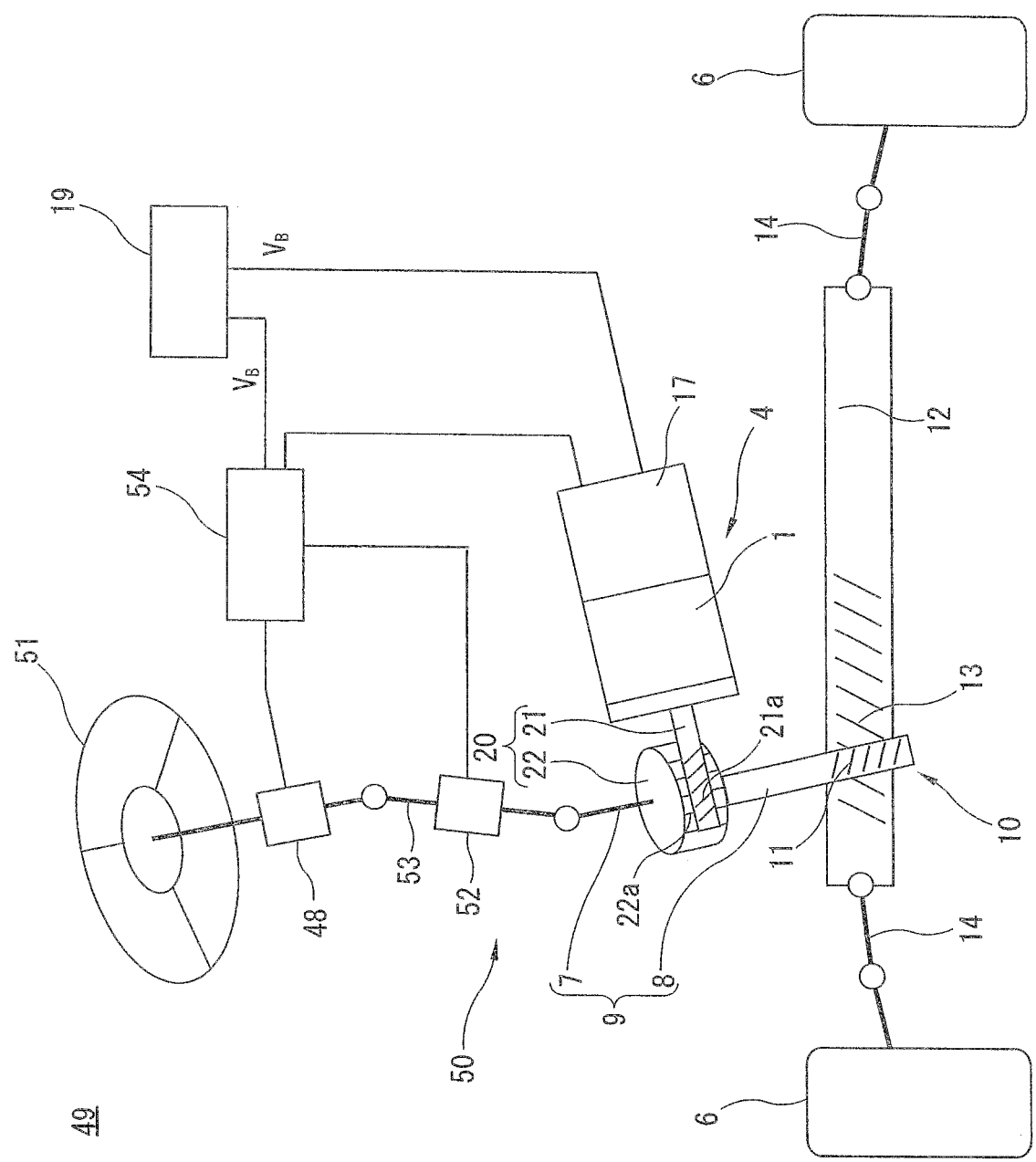
FIG. 15 is a schematic view showing a steer-by-wire.

FIG. 15 is a schematic view showing a power steering device 49 of a steer-by-wire type including a motor 48.

The power steering device 49 is based on the configuration in the first embodiment. In the power steering device 49, the steering mechanism 3 in the first embodiment is varied to a steering mechanism 50 of the steer-by-wire. Besides, the configurations identical to those in the first embodiment have the same symbols. The repetitive explanations are omitted.

In the power steering device 49, the steering input device 5 by which the driver performs steering operation, for example, the steering wheel is arranged to be mechanically separated by a clutch 52 from the turning mechanism 10 arranged to turn the steered wheels 6 and 6.

The steering input device 51 is connected to the motor 48 which is a reaction force providing mechanism arranged to provide the steering reaction force (the reaction torque) with respect to the steering input device 51. The motor 48 is a reaction motor. The motor 48 is the three phase brushless motor identical to the motor 1 in the first embodiment and the motor 45 in the third embodiment. The serial/parallel switching circuit 32, the switching sections E1, E2, F1, F2, G1, and G2, the stator coils U1, V1, W1, U2, V2, and W2, and so on in the first embodiment and the third embodiment are applied to this motor 48.

In a case where the motor 48 is constituted as the motor 1 in the first embodiment, the connection switching sections 34U, 34V, and 34W are configured to switch the connections of the first stator coils U1, V1, and W1 and the second stator coils U2, V2, and W2 from the parallel connection to the serial connection near the stroke end of the steering input device 51.

Moreover, in a case where the motor 48 is constituted as the motor 45 in the first embodiment, the connection switching sections 34AU, 34AV, and 34AW are configured to switch the connections of the stator coils UA1, VA1, WA1, UB1, VB1, and WA1 and the stator coils UA2, VA2, WA2, UB2, VB2, and WB2 from the parallel connection to the serial connection near the stroke end of the steering input device 51.

Furthermore, the motor 48 is connected by a connection shaft 53 to a clutch 52 which is a power interrupting means.

This clutch 52 is arranged to connect the connection shaft 53 and the input shaft 7 when the steering mechanism 50 is failed.

The motor 48 and the clutch 52 are electrically connected to the reaction force control device 54. The reaction force control device 54 has the configuration identical to that of the control device in the first embodiment. The reaction force control device 54 is configured to control and drive the motor 48 based on the output from the steering angle sensor, the torque sensor, and the vehicle speed sensor (not shown). The reaction force control device 54 is electrically connected to the control device 17 configured to control the motor 1. The reaction force control device 54 and the control device 17 are supplied with the electric power $V_B$ from the power source 19.

[Effects of Fourth Embodiment]

In the fourth embodiment, the power steering device 49 is the steer-by-wire in which the steering input device 51 by which the driver performs the steering operation, and the turning mechanism 10 arranged to turn the steered wheels 6 and 6 are separated from each other. The motor 48 is arranged to provide the steering reaction force of the steering input device 51. The connection switching sections 34U, 34V, and 34W are configured to switch the connections of the first stator coils U1, V1, and W1 and the second stator coils U2, V2, and W2 to the serial connection near the stroke end of the steering input device 51.

Near the stroke end of the steering input device 51, the high torque characteristics of the motor 48 is needed for suppressing the strong impact of the rack end stopper against the rack housing, by restricting the motion of the steering input device 51. Accordingly, by bringing the connections of the first stator coils U1, V1, and W1 and the second stator coils U2, V2, and W2 to the serial connection, it is possible to restrict the motion of the steering input device 51, and to relieve the impact of the rack end stopper against the rack housing.

Besides, the connection switching sections 34U, 34V, and 34W are not necessarily switched from the parallel connection to the serial connection near the stroke end. The connection switching sections 34U, 34V, and 34W are configured to be controlled to be the serial connection at least near the stroke end.

Fifth Embodiment

Figure 16:
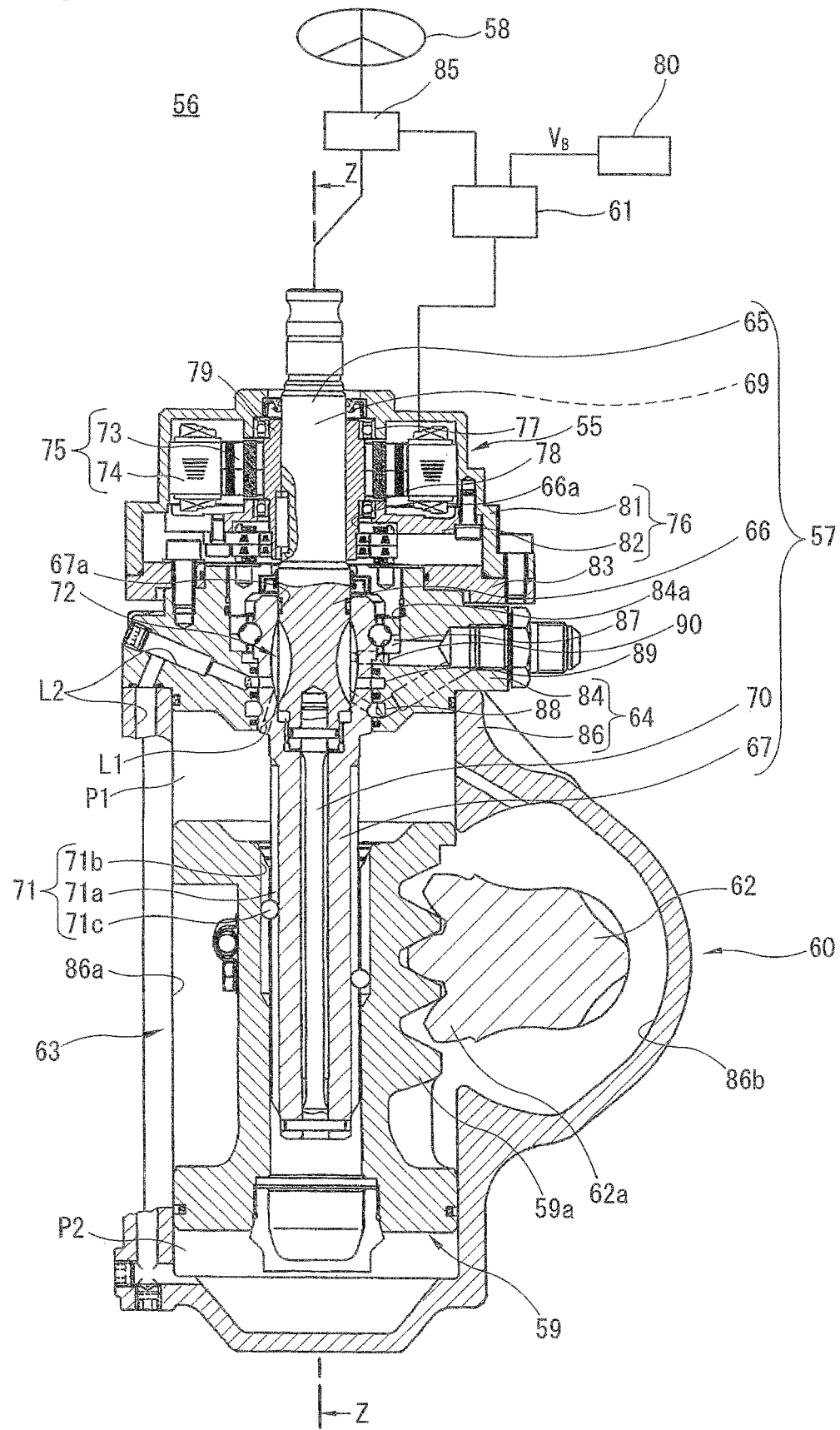
FIG. 16 is a vertical sectional view of an integral power steering device.

FIG. 16 is a vertical sectional view showing an integral type power steering device 56 including a motor 55. In FIG. 16, "first end" represents a side (upper side in the drawing) which is linked to a steering wheel 58 in the rotation axis Z direction of the steering shaft 57. "Second end" represents a side (lower side in the drawing) which is linked to a piston 59 in the Z direction of the rotation axis of the steering shaft 57.

The integral type power steering device 56 is used in large vehicle and so on. The integral power steering device 56 includes a power steering device main body 60; the motor 55, and a control device (ECU) 61.

The power steering device main body 60 includes the steering shaft 57; a sector shaft 62; and a power cylinder 63.

A portion of the steering shaft 57 is received within a housing 64. The steering shaft 57 includes an input shaft 65; an intermediate shaft 66; and an output shaft 67. The input shaft 65 includes a first end portion which is linked to the steering wheel 58, and which serves for the steering torque input of the driver. The input shaft 65 includes a second end portion inserted into an opening recessed portion 66a formed on the first end side of the intermediate shaft 66. The intermediate shaft 66 is inserted into an opening recessed portion 67a formed on a first end side large diameter portion of the output shaft 67. The output shaft 67 includes a first end side connected through a second torsion bar 70 to the Intermediate shaft 66 to be rotated relative to the intermediate shaft 66. The output shaft 67 is arranged to output the steering torque Inputted from the intermediate shaft 66, through a ball screw mechanism 71 which is a conversion mechanism to the piston 59.

The ball screw mechanism 71 includes the output shaft 67 which is a screw shaft, and which includes a ball groove 71a that is a helical groove formed on an outer circumference on the second end side of the output shaft 67; the piston 59 which serves as a nut, and which includes a ball groove 71b being a helical groove that is formed on the outer circumference of the output shaft 67, and that corresponds to the ball groove 71a; a plurality of balls 71c provided between the piston 59 and the output shaft 67.

A known rotary valve 72 which is a control valve is constituted between the intermediate shaft 66 and the output shaft 67. The rotary valve 72 is arranged to selectively supply the hydraulic fluid supplied a pump (not shown) mounted on the vehicle, to first and second hydraulic chambers (pressure chambers) P1 and P2 in accordance with the torsion amount and the torsion direction of the second torsion bar 70 obtained from the relative rotation angle of the Intermediate shaft 66 and the output shaft 67.

The sector shaft 62 is a transmitting mechanism serving for the turning according to the axial movement of the piston 59 provided on the outer circumference of the second end side of the steering shaft 57. The sector shaft 62 is linked through pitman arm to the steered wheels.

A power cylinder 63 is constituted by the first and second hydraulic chambers P1 and P2 which are the pair of fluid chambers, and which are defined by the cylindrical piston 59 arranged to be slidably moved within the housing 64. The power cylinder 63 is a hydraulic actuator arranged to produce the assist torque to assist the steering torque.

The motor 55 includes a motor element 75 including a motor rotor 73 and a motor stator 74; a motor housing 76 receiving the motor element 75; and a first bearing 77 and a second bearing 78 rotatably supporting a connection member 79.

The motor rotor 73 is mounted through the cylindrical connection member 79 on the outer circumference portion of the input shaft 65 to rotate as a unit with the input shaft 65. The motor stator 74 is disposed radially outside the motor rotor 73 with a predetermined clearance. Moreover, the motor stator 74 is electrically connected to a control device 61 outside the housing 64. The control device 61 is supplied with the electric power $V_B$ from the power source 80.

The motor 55 is the three phase brushless motor identical to the motor 1 in the first embodiment, and the motor 45 in the third embodiment. The motor 55 is arranged to provide the rotation torque to the input shaft 65. The serial/parallel switching circuit 32, the switching sections E1, E2, F1, F2, G1, and G2, the stator coils U1, V1, W1, U2, V2, and W2, and so on in the first embodiment and the third embodiment are applied to this motor 55.

In a case where the motor 55 is constituted as the motor 1 in the first embodiment, the connections of the first stator coils U1, V1, and W1 and the stator coils U2, V2, and W2 are switched to the serial connection when the power steering device 56 is failed.

Moreover, in a case where the motor 55 is constituted as the motor 45 in the first embodiment, the connections of the stator coils UA1, VA1, WA1, UB1, VB1, and WA1 and the stator coils UA2, VA2, WA2, UB2, VB2, and WB2 from the parallel connection to the serial connection when the power steering device 56 is failed.

The motor housing 76 is made from metal material, for example, aluminum alloy. The motor housing 76 includes a first motor housing 81 which has a cup shape, and which receives the motor element 75; and a second motor housing 82 closing the first motor housing 81. The first motor housing 81 is fixed through an adapter member 83 to the housing 64 (the second housing 84).

The first bearing 77 and the second bearing 78 are received and held within the motor housing 76. The first bearing 77 and the second bearing 78 rotatably support, respectively, the first end side and the second end side of the connection member 79.

The control device 61 is constituted by electric components such as the microcomputer. The control device 61 is configured to control and drive the motor 55 based on the steering condition and so on. The control device 61 is electrically connected to a power source 80 arranged to provide the electric power to the control device 61, and a torque sensor 85 arranged to sense the steering torque Tr. The steering torque Tr is calculated by multiplying a difference between the rotation angle of the input shaft 65 and the rotation angle of the Intermediate shaft 66 by a torsion spring constant of the first torsion bar. The torque sensor 85 is electrically connected to the control device 61.

The housing 64 has a cylindrical shape having a first end side which is opened; and a second end side which is closed. The housing 64 includes the first housing 86 defining the first and second fluid chambers P1 and P2; and the second housing 84 which is disposed to cover the first 30o end opening portion of the first housing 86, and which receives the rotary valve 72. The first and second housings 86 and 84 are tightened by a plurality of fixing means (not shown) provided to the outer circumference portions of the first and second housings 86 and 84, for example, bolts.

The first housing 86 includes a cylinder constituting portion 86a formed within the first housing 86 along the rotation axis Z direction of the steering shaft 57; and a shaft receiving portion 86b which is formed within the first housing 86 to be perpendicular to the cylinder constituting portion 86a, and whose a portion confronts the cylinder constituting portion 86a. The piston 59 linked with the output shaft 67 is received within the cylinder constituting portion 86a so as to define the first fluid chamber P1 on the first end side, and the second fluid chamber P2 on the second end side. Moreover, the shaft receiving portion 86b receives the sector shaft 62 including a first axial end side linked to the piston 59, and a second axial end side linked through the pitman arm (not shown) to the steered wheels.

The piston 59 and the sector shaft 62 include, respectively, teeth portions 59a and 62a which are formed on the outer circumference portion of the piston 59 and the sector shaft 62, and which are arranged to be engaged with each other. By the engagement of the teeth portions 59a and 62a, the sector shaft 62 is pivoted in accordance with the axial movement of the piston 59. With this, the pitman arm is pulled in the vehicle width direction to vary the directions of the steered wheels. Besides, in this case, the hydraulic fluid within the first fluid chamber P1 is introduced into the shaft receiving portion 86b, so as to lubricate between the teeth portions 59a and 62a.

The second housing 84 includes an shaft insertion hole 84a which is formed on the inner circumference side, into which the intermediate shaft 66 and the output shaft 67 overlapped with each other are inserted, and which has a stepped shape in which the diameter is decreased in the rotation axis Z direction from the first end side to the second end side to penetrate in the rotation axis Z direction. A large diameter portion of the shaft insertion hole 84*a* on the first end side receives the bearing 87 rotatably supporting the output shaft 67. On the other hand, a small diameter portion of the shaft insertion hole 84*a* on the second end side includes an introduction port 88 connected to the pump (not shown); a supply and discharge port 89 arranged to supply and discharge the hydraulic pressure introduced from the introduction port 88 to and from the fluid chambers P1 and P2; and a discharge port 90 arranged to discharge the hydraulic fluid discharged from the hydraulic chambers P1 and P2 through the supply and discharge port, to a reservoir (not shown). The supply and discharge port 89 is connected to the first fluid chamber P1 through a first supply and discharge passage L1 provided to the one end side diameter increasing portion of the output shaft 67, and connected to the second fluid chamber P2 through a second supply and discharge passage L2 formed within the first housing 86, and so on.

By the above-described configuration, in the integral type power steering device 56, when the steering wheel 58 is operated, the hydraulic fluid pressurized and transmitted from the pump (not shown) is supplied through the rotary valve 72 to one of the fluid chambers P1 and P2 according to the steering direction. Moreover, the hydraulic fluid corresponding to the supplied amount is discharged from the other of the hydraulic chambers P1 and P2 to the reservoir tank. The piston 59 is driven by the hydraulic pressure so as to provide the assist torque based on the hydraulic pressure acted to the piston 59, to the sector shaft 62.

Effects of Fifth Embodiment

In the fifth embodiment, the integral power steering device 56 includes the pair of the first and second fluid chambers P1 and P2, the piston 59 partitioning the pair of the first and second fluid chambers P1 and P2, and the ball screw mechanism 71 including the nut and the ball screw arranged to be moved with the piston 59. The motor 55 is arranged to provide the rotation torque to the input shaft 65 of the integral power steering device 56. The switching sections 34U, 34V, and 34W are arranged to bring the connections of the first stator coils U1, V1, and W1 and the second stator coils U2, V2, and W2 to the serial connection when the integral power steering device 56 is failed.

Accordingly, when the integral power steering device 56 is failed, the motor 55 provides the steering force to the input shaft 65. With this, it is possible to improve the safety of the Integral power steering device 56. In particular, when the high torque characteristics is needed, it is possible to relieve the steering load of the driver by bringing the connections of the first stator coils U1, V1, and W1 and the second stator coils U2, V2, and W2.

For example, when the rotary valve 72 of the integral power steering device 56 is failed, the motor 55 provides the steering force to the input shaft 65. With this, it is possible to assist the steering of the driver.

Moreover, in a case where the motor 55 is constituted as the motor 45 in the third embodiment, when one of the systems is failed, the other of the systems provides the steering force to the input shaft 65. With this, it is possible to assist the steering of the driver.

Sixth Embodiment (Configuration of Brake Device)

Figure 17:
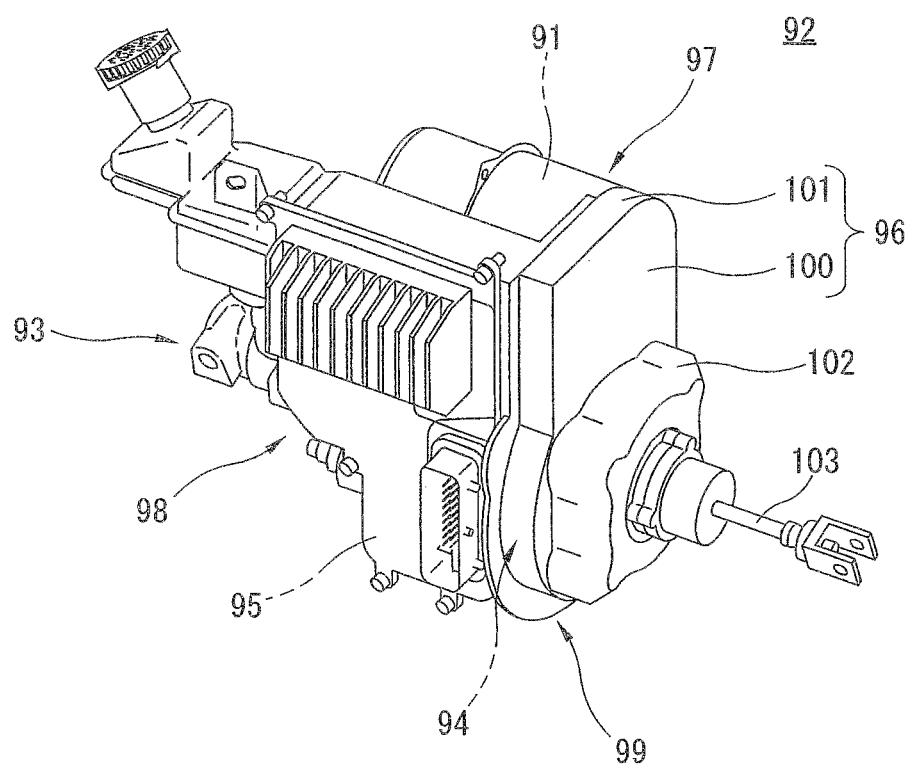
FIG. 17 is a perspective view showing a brake device.

FIG. 17 is a perspective view showing a brake apparatus including a motor 91.

The brake device 92 is applicable, for example, to a brake system mounted within an engine room of a vehicle. The brake device 92 includes a braking device (master cylinder) 93; a motor 91; a torque conversion mechanism 94; and a control unit 95.

The braking device 93 receives a piston (not shown) which extends from a brake pedal (not shown) toward the engine room, and which is arranged to produce a brake hydraulic pressure by the operation of the brake pedal.

The motor 91 is the three phase brushless motor identical to the motor 1 in the first embodiment and the motor 45 in the third embodiment. The motor 91 is arranged to provide the braking force to the braking device 93 of the vehicle. The serial/parallel switching circuit 32, the switching sections E1, E2, F1, F2, G1, and G2, the stator coils U1, V1, W1, U2, V2, and W2, and so on in the first embodiment and the third embodiment are applied to this motor 48.

In a case where the motor 91 is constituted as the motor 1 in the first embodiment, the connection switching sections 34U, 34V, and 34W are configured to switch the connections of the first stator coils U1, V1, and W1 and the second stator coils U2, V2, and W2 to the serial connection when the braking force is held.

Moreover, in a case where the motor 91 is constituted as the motor 45 in the first embodiment, the connection switching sections 34AU, 34AV, and 34AW are configured to switch the connections of the stator coils UA1, VA1, WA1, UB1, VB1, and WA1 and the stator coils UA2, VA2, WA2, UB2, VB2, and WB2 to the serial connection when the braking force is held.

The torque conversion mechanism 94 is arranged to convert the torque produced by the motor to the piston driving force.

The control unit 95 includes a circuit board (not shown) on which driving elements arranged to drive the motor 91 are mounted.

The control device 93, the motor 91, the torque conversion mechanism 94, and the control unit 95 are received within a housing unit 99 including a plurality of receiving portions (a vehicle body side mounting portion 96, a motor receiving portion 97, and a control unit receiving portion 98).

The housing unit 99 includes the vehicle body side mounting portion 96 receiving the torque conversion mechanism 94 mounted to a vehicle body panel (not shown) (for example, a vehicle body panel between the brake pedal and the engine room). Moreover, the housing unit 99 includes the motor receiving portion 97 receiving the motor 91; and the control unit receiving portion 98 receiving the control unit 95. The housing unit 99 is integrally formed so that the motor receiving portion 97 and the control unit 98 are apart from each other to protrude from the vehicle body side mounting portion 96 toward the control device 93 side.

The vehicle body side mounting portion 96 includes a rectangular bottom wall 100 receiving the torque conversion mechanism 9 arranged to transmit the torque produced by the motor, and to convert to the driving force of the piston; and a circumferential wall 101 surrounding the circumference of the bottom wall 100, and protruding toward the control device 93 side. An expansion portion 102 is formed at a portion on an outer side of the bottom wall 100. The expansion portion 102 protrudes in the outer side direction. The expansion portion 102 is fixed to the vehicle body panel (not shown).

In this vehicle body mounting portion 96, in a posture where the expansion portion 102 side is fixed to the vehicle body panel, an Input rod 103 connected to the piston penetrates through the expansion portion 102, and extends at a position at which the input rod 103 is not coaxial with the rotor. Moreover, a known rotation-linear movement conversion mechanism (for example, mechanism including a belt, a pulley, a gear mechanism, and so on) is Installed in the vehicle body side mounting portion 96. This rotation-liner movement conversion mechanism is arranged to convert the rotation movement of the rotor of the motor 91 actuated by the depression of the brake pedal, to the linear movement of the piston in the axial direction. With this, it is possible to move the piston within the control device 93 in the linear direction in the axial direction.

Effects of Sixth Embodiment

In the sixth embodiment, the motor 91 is a brushless motor for a brake apparatus arranged to provide the braking force to the braking device 9 of the vehicle. The connection switching sections 34U, 34V, and 34W are configured to bring the connections of the first stator coils U1, V1, and W1 and the second stator coils U2, V2, and W2 to the serial connection when the braking force is held.

Accordingly, it is possible to output the high torque by bringing the first stator coils U1, V1, W1 and the second stator coils U2, V2, and W2 to the serial connection when the braking force is held. On the other hand, at the stroke, it is possible to improve the response by bringing the first stator coils U1, V1, W1 and the second stator coils U2, V2, and W2 to the parallel connection.

Besides, in the above-described embodiments, the stator coils U1, V1, W1, U2, V2, W2, and so on are connected by the star connection. The stator coils U1, V1, W1, U2, V2, W2, and so on may be connected by delta connection.

For example, following aspects are conceivable as the brushless motor based on the above-described embodiments.

A brushless motor according to one aspect includes: a motor rotor; a stator coil section which has a plurality of energization phases, which includes a first stator coil and a second stator coil that are provided to each phase, and which is arranged to generate a magnetic field, and thereby rotate the motor rotor; and a connection switching section configured to switch a connection of the first stator coil and the second stator coil from a serial connection to a parallel connection, or from the parallel connection to the serial connection.

In a preferred aspect of the brushless motor, both end portions of the first stator coil and both end portions of the second stator coil are provided on the same side of the motor rotor in a direction of a rotation axis of the motor rotor.

In another preferred aspect, in one of the brushless motors according to the above-described aspects, the stator coil section includes a first stator coil section and a second stator coil section; the first stator coil includes a first first stator coil provided to the first stator coil section, and a second first stator coil provided to the second stator coil section; the second stator coil includes a first second stator coil provided to the first stator coil section, and a second second stator coil provided to the second stator coil section; and the connection switching section includes a first connection switching section configured to switch a connection of the first first stator coil and the first second stator coil from the serial connection to the parallel connection, or from the parallel connection to the serial connection, and a second connection switching section configured to switch a connection of the second first stator coil and the second second stator coil from the serial connection to the parallel connection, or from the parallel connection to the serial connection.

In still another preferred aspect, in one of the brushless motors according to the above-described aspects, the brushless motor includes an energization control section including a first energization control section configured to control energization of the first stator coil section, and a second energization control section configured to control energization of the second stator coil section, a first abnormal state judging section configured to judge whether or not the energization control of the first stator coil section is performed in a normal state, and a second abnormal state judging section configured to judge whether or not the energization control of the second stator coil section is performed in the normal state; and when the first abnormal state judging section and the second abnormal state judging section judges that one of the first stator coil section and the second stator coil section is in an abnormal state, the energization control section continuously perform the control of the other of the first stator coil section and the second stator coil section.

In still another preferred aspect, in one of the brushless motors according to the above-described aspects, the brushless motor includes an energization control section which has a plurality of transistors, and which is arranged to perform an energization control of the stator coil section; the connection switching section includes a transistor; and the transistors of the energization control section and the transistors of the connection switching portion are mounted in a same package module.

In still another preferred aspect, in one of the brushless motors according to the above-described aspects, the connection switching section includes a serial connection switching section configured to be brought to an energization state to connect the first stator coil and the second stator coil in serial, and a parallel connection switching section configured to be brought to the energization state to connect the first stator coil and the second stator coil in parallel; and when the connection of the first stator coil and the second stator coil is switched from the parallel connection to the serial connection, the serial connection switching section is brought to the energization state after the parallel connection switching section is brought to a deenergization state.

In still another preferred aspect, in one of the brushless motors according to the above-described aspects, the connection switching section includes a serial connection switching section configured to be brought to an energization state to connect the first stator coil and the second stator coil in serial, and a parallel connection switching section configured to be brought to the energization state to connect the first stator coil and the second stator coil in parallel; and when the connection of the first stator coil and the second stator coil is switched from the serial connection to the parallel connection, the parallel connection switching section Is brought to the energization state after the serial connection switching section is brought to a deenergization state.

In still another preferred aspect, in one of the brushless motors according to the above-described aspects, the brushless motor includes an energization control section configured to perform an energization control of the stator coil section; and the energization control section is configured to vary an energization amount to the stator coil section when the connection switching section switches the connection of the first stator coil and the second stator coil from the serial connection to the parallel connection, or from the parallel connection to the serial connection.

In still another preferred aspect, in one of the brushless motors according to the above-described aspects, when the connection switching section switches the connection of the first stator coil and the second stator coil from the serial connection to the parallel connection, or from the parallel connection to the serial connection, the energization control section is configured to gradually vary from a target value of the energization amount before the switching to a target value of the energization amount after the switching.

In still another preferred aspect, in one of the brushless motors according to the above-described aspects, the brushless motor is a brushless motor for a power steering device arranged to provide assist force to steered wheels of a vehicle.

In still another preferred aspect, in one of the brushless motors according to the above-described aspects, the connection switching section is configured to switch the connection of the first stator coil and the second stator coil in accordance with a vehicle speed.

In still another preferred aspect, in one of the brushless motors according to the above-described aspects, the connection switching section is configured to switch the connection of the first stator coil and the second stator coil in accordance with a steering torque.

In still another preferred aspect, in one of the brushless motors according to the above-described aspects, the connection switching section is configured to switch the connection of the first stator coil and the second stator coil in accordance with a steering speed.

In still another preferred aspect, in one of the brushless motors according to the above-described aspects, the brushless motor includes an energization control section which includes a plurality of transistors, and which is configured to perform an energization control of the stator coil section; and the connection switching section is configured to switch the connection of the first stator coil and the second stator coil in accordance with a heating amount of the transistors.

In still another preferred aspect, in one of the brushless motors according to the above-described aspects, the power steering device is a steer-by-wire in which a steering input device by which a driver performs steering operation, and a turning mechanism arranged to turn steered wheels are separated; the brushless motor is arranged to provide a steering reaction force of the steering input device; and the connection switching section is configured to switch the connection of the first stator coil and the second stator coil to the serial connection near a stroke end of the steering input device.

In still another preferred aspect, in one of the brushless motors according to the above-described aspects, the power steering device is an integral power steering device including a pair of hydraulic chambers, a piston partitioning the pair of the hydraulic chambers, and a ball screw mechanism including a ball screw and a nut arranged to be moved with the piston; the brushless motor is arranged to provide a rotation torque to an input shaft of the integral power steering device; and the connection switching portion is configured to switch the connection of the first stator coil and the second stator coil to the serial connection when the integral power steering device is malfunctioned.

In still another preferred aspect, in one of the brushless motors according to the above-described aspects, the brushless motor is a brushless motor for a brake apparatus arranged to provide a braking force to a braking device for a vehicle; and the connection switching section is configured to switch the connection of the first stator coil and the second stator coil to the serial connection when the braking force is held.

In still another preferred aspect, in one of the brushless motors according to the above-described aspects, the brushless motor includes an energization control section configured to perform an energization control of the stator coil section; and the connection switching section is configured to switch the connection of the first stator coil and the second stator coil when the energization control section is 0A.

The invention claimed is:

1. A brushless motor comprising:
a motor rotor;
a stator coil section which has a plurality of energization phases, which includes a first stator coil and a second stator coil that are provided to each phase, and which is arranged to generate a magnetic field, and thereby rotate the motor rotor; and
a connection switching section configured to switch a connection of the first stator coil and the second stator coil from a serial connection to a parallel connection, or from the parallel connection to the serial connection,
wherein the stator coil section includes a first stator coil section and a second stator coil section; the first stator coil includes a first first stator coil provided to the first stator coil section, and a second first stator coil provided to the second stator coil section; the second stator coil includes a first second stator coil provided to the first stator coil section, and a second second stator coil provided to the second stator coil section; and the connection switching section includes a first connection switching section configured to switch a connection of the first first stator coil and the first second stator coil from the serial connection to the parallel connection, or from the parallel connection to the serial connection, and a second connection switching section configured to switch a connection of the second first stator coil and the second second stator coil from the serial connection to the parallel connection, or from the parallel connection to the serial connection,
wherein the brushless motor includes an energization control section including a first energization control section configured to control energization of the first stator coil section, and a second energization control section configured to control energization of the second stator coil section, a first abnormal state judging section configured to judge whether or not the energization control of the first stator coil section is performed in a normal state, and a second abnormal state judging section configured to judge whether or not the energization control of the second stator coil section is performed in the normal state, and
wherein in a state where the first stator coil section and the second stator coil section are in the parallel connections, when the first abnormal state judging section and the second abnormal state judging section judges that one of the first stator coil section and the second stator coil section is in an abnormal state, one of the first connection switching section and the second connection switching section is configured to switch the other of the first stator coil section and the second stator coil section to the serial connection.

2. The brushless motor as claimed in claim 1, wherein both end portions of the first stator coil and both end portions of the second stator coil are provided on the same side of the motor rotor in a direction of a rotation axis of the motor rotor.

3. The brushless motor as claimed in claim 1, wherein the energization control section has a plurality of transistors the connection switching section includes a transistor; and the transistors of the energization control section and the transistors of the connection switching portion are mounted in a same package module.

4. The brushless motor as claimed in claim 1, wherein the connection switching section includes a serial connection switching section configured to be brought to an energization state to connect the first stator coil and the second stator coil in serial, and a parallel connection switching section configured to be brought to the energization state to connect the first stator coil and the second stator coil in parallel; and
when the connection of the first stator coil and the second stator coil is switched from the parallel connection to the serial connection, the serial connection switching section is brought to the energization state after the parallel connection switching section is brought to a deenergization state.

5. The brushless motor as claimed in claim 1, wherein the connection switching section includes a serial connection switching section configured to be brought to an energization state to connect the first stator coil and the second stator coil in serial, and a parallel connection switching section configured to be brought to the energization state to connect the first stator coil and the second stator coil in parallel; and
when the connection of the first stator coil and the second stator coil is switched from the serial connection to the parallel connection, the parallel connection switching section is brought to the energization state after the serial connection switching section is brought to a deenergization state.

6. The brushless motor as claimed in claim 1, wherein the energization control section is configured to vary an energization amount to the stator coil section when the connection switching section switches the connection of the first stator coil and the second stator coil from the serial connection to the parallel connection, or from the parallel connection to the serial connection.

7. The brushless motor as claimed in claim 6, wherein when the connection switching section switches the connection of the first stator coil and the second stator coil from the serial connection to the parallel connection, or from the parallel connection to the serial connection, the energization control section is configured to gradually vary from a target value of the energization amount before the switching to a target value of the energization amount after the switching.

8. The brushless motor as claimed in claim 1, wherein the brushless motor is a brushless motor for a power steering device arranged to provide assist force to steered wheels of a vehicle.

9. The brushless motor as claimed in claim 8, wherein the connection switching section is configured to switch the connection of the first stator coil and the second stator coil in accordance with a vehicle speed.

10. The brushless motor as claimed in claim 8, wherein the connection switching section is configured to switch the connection of the first stator coil and the second stator coil in accordance with a steering torque.

11. The brushless motor as claimed in claim 8, wherein the connection switching section is configured to switch the connection of the first stator coil and the second stator coil in accordance with a steering speed.

12. The brushless motor as claimed in claim 1, wherein the brushless motor is a brushless motor for a brake apparatus arranged to provide a braking force to a braking device for a vehicle; and the connection switching section is configured to switch the connection of the first stator coil and the second stator coil to the serial connection when the braking force is held.

13. The brushless motor as claimed in claim 1, wherein the connection switching section is configured to switch the connection of the first stator coil and the second stator coil when the energization control section is 0A.

14. A brushless motor comprising:
a motor rotor;
a stator coil section which has a plurality of energization phases, which includes a first stator coil and a second stator coil that are provided to each phase, and which is arranged to generate a magnetic field, and thereby rotate the motor rotor; and
a connection switching section configured to switch a connection of the first stator coil and the second stator coil from a serial connection to a parallel connection, or from the parallel connection to the serial connection,
wherein the stator coil section includes a first stator coil section and a second stator coil section; the first stator coil includes a first first stator coil provided to the first stator coil section, and a second first stator coil provided to the second stator coil section; the second stator coil includes a first second stator coil provided to the first stator coil section, and a second second stator coil provided to the second stator coil section; and the connection switching section includes a first connection switching section configured to switch a connection of the first first stator coil and the first second stator coil from the serial connection to the parallel connection, or from the parallel connection to the serial connection, and a second connection switching section configured to switch a connection of the second first stator coil and the second second stator coil from the serial connection to the parallel connection, or from the parallel connection to the serial connection,
wherein the brushless motor includes an energization control section including a first energization control section configured to control energization of the first stator coil section, and a second energization control section configured to control energization of the second stator coil section, a first abnormal state judging section configured to judge whether or not the energization control of the first stator coil section is performed in a normal state, and a second abnormal state judging section configured to judge whether or not the energization control of the second stator coil section is performed in the normal state; and
when the first abnormal state judging section and the second abnormal state judging section judges that one of the first stator coil section and the second stator coil section is in an abnormal state, the energization control section continuously perform the control of the other of the first stator coil section and the second stator coil section.

15. A brushless motor comprising:
a motor rotor;
a stator coil section which has a plurality of energization phases, which includes a first stator coil and a second stator coil that are provided to each phase, and which is arranged to generate a magnetic field, and thereby rotate the motor rotor; and
a connection switching section configured to switch a connection of the first stator coil and the second stator coil from a serial connection to a parallel connection, or from the parallel connection to the serial connection, wherein the brushless motor is a brushless motor for a power steering device arranged to provide assist force to steered wheels of a vehicle, and wherein the brushless motor includes an energization control section which includes a plurality of transistors, and which is configured to perform an energization control of the stator coil section; and the connection switching section is configured to switch the connection of the first stator coil and the second stator coil in accordance with a heating amount of the transistors.

16. A brushless motor comprising:

a motor rotor;

a stator coil section which has a plurality of energization phases, which includes a first stator coil and a second stator coil that are provided to each phase, and which is arranged to generate a magnetic field, and thereby rotate the motor rotor; and a connection switching section configured to switch a connection of the first stator coil and the second stator coil from a serial connection to a parallel connection, or from the parallel connection to the serial connection, wherein the brushless motor is a brushless motor for a power steering device arranged to provide assist force to steered wheels of a vehicle, and wherein the power steering device is a steer-by-wire in which a steering input device by which a driver performs steering operation, and a turning mechanism arranged to turn steered wheels are separated; the brushless motor is arranged to provide a steering reaction force of the steering input device; and the connection switching section is configured to switch the connection of the first stator coil and the second stator coil to the serial connection near a stroke end of the steering input device.

17. A brushless motor comprising:

a motor rotor;

a stator coil section which has a plurality of energization phases, which includes a first stator coil and a second stator coil that are provided to each phase, and which is arranged to generate a magnetic field, and thereby rotate the motor rotor; and a connection switching section configured to switch a connection of the first stator coil and the second stator coil from a serial connection to a parallel connection, or from the parallel connection to the serial connection, wherein the brushless motor is a brushless motor for a power steering device arranged to provide assist force to steered wheels of a vehicle, and wherein the power steering device is an integral power steering device including a pair of hydraulic chambers, a piston partitioning the pair of the hydraulic chambers, and a ball screw mechanism including a ball screw and a nut arranged to be moved with the piston; the brushless motor is arranged to provide a rotation torque to an input shaft of the integral power steering device; and the connection switching portion is configured to switch the connection of the first stator coil and the second stator coil to the serial connection when the integral power steering device is malfunctioned.

\* \* \* \* \*